United States Patent
Ruchet et al.

(10) Patent No.: US 10,270,554 B2
(45) Date of Patent: *Apr. 23, 2019

(54) OPTICAL POWER MEASUREMENT IN A PASSIVE OPTICAL NETWORK

(71) Applicant: EXFO INC., Quebec (CA)

(72) Inventors: Bernard Ruchet, Quebec (CA); Mario L'Heureux, Levis (CA); Daniel Gariepy, Quebec (CA); Etienne Morin-Drouin, Quebec (CA)

(73) Assignee: EXFO INC., Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/822,339

(22) Filed: Nov. 27, 2017

(65) Prior Publication Data

US 2018/0076890 A1    Mar. 15, 2018

Related U.S. Application Data

(63) Continuation-in-part of application No. 15/263,986, filed on Sep. 13, 2016, now Pat. No. 9,831,948.

(Continued)

(51) Int. Cl.
*H04B 17/00*    (2015.01)
*H04J 14/02*    (2006.01)
*H04B 10/079*    (2013.01)

(52) U.S. Cl.
CPC ........ *H04J 14/02* (2013.01); *H04B 10/07955* (2013.01); *H04J 14/0221* (2013.01)

(58) Field of Classification Search
CPC ....... H04Q 11/0067; H04Q 2011/0079; H04Q 2011/0081; H04Q 2011/0083;

(Continued)

(56) References Cited

U.S. PATENT DOCUMENTS

| 4,234,253 A | 11/1980 | Higginbotham et al. |
| 4,673,291 A | 6/1987 | Heckmann |

(Continued)

FOREIGN PATENT DOCUMENTS

| DE | 19928940 A1 | 1/2001 |
| EP | 0786878 A2 | 7/1997 |

(Continued)

OTHER PUBLICATIONS

Acterna (JDSU) Optical Level Controller OLC-65 Press Release, Jun. 2003.

(Continued)

*Primary Examiner* — Don N Vo
(74) *Attorney, Agent, or Firm* — Erise IP, P.A.

(57) ABSTRACT

A device and method for optical power measurement in an optical network supporting upstream and downstream signal propagation along an optical transmission path. The device includes an upstream wavelength analyzer receiving upstream light extracted from the optical transmission path and configured to determine an upstream spectral characteristic of the extracted upstream light. The device also includes a downstream filter assembly receiving downstream light extracted from the optical transmission path and configured to spectrally split the extracted downstream light into a plurality of downstream signals, one of which corresponding to a downstream signal of interest. The device further includes a processing unit configured to identify, based on the upstream spectral characteristic, the downstream signal of interest among the downstream filtered signals, and a downstream optical power meter assembly coupled to the downstream filter assembly and configured to measure an optical power parameter of the downstream signal of interest.

22 Claims, 7 Drawing Sheets

Related U.S. Application Data

(60) Provisional application No. 62/288,199, filed on Jan. 28, 2016, provisional application No. 62/221,678, filed on Sep. 22, 2015.

(58) Field of Classification Search
CPC ...... H04B 10/03; H04B 3/46; H04B 10/1143; H04B 10/2503; H04B 10/27; H04B 10/0775; H04B 10/07955; H04J 14/02; H04J 14/0221
USPC .......................................................... 398/38
See application file for complete search history.

(56) References Cited

U.S. PATENT DOCUMENTS

| | | |
|---|---|---|
| 4,726,676 A | 2/1988 | Maslaney et al. |
| 4,737,026 A | 4/1988 | Dalgoutte et al. |
| 4,737,027 A | 4/1988 | Maeda |
| 4,799,790 A | 1/1989 | Tsukamoto et al. |
| 4,901,003 A | 2/1990 | Clegg |
| 5,305,078 A | 4/1994 | Lamonde |
| 5,383,015 A | 1/1995 | Grimes |
| 5,455,672 A | 10/1995 | Lamonde et al. |
| 5,535,038 A | 7/1996 | Hinch |
| 5,537,500 A | 7/1996 | Yokoyama |
| 5,696,707 A | 12/1997 | Hentschel et al. |
| 5,825,516 A | 10/1998 | Walsh |
| 6,072,614 A | 6/2000 | Roberts |
| 6,111,676 A | 8/2000 | Lemus et al. |
| 6,188,509 B1 | 2/2001 | Lee et al. |
| 6,396,575 B1 | 5/2002 | Holland |
| 6,476,919 B1 | 11/2002 | Mori et al. |
| 6,480,977 B1 | 11/2002 | Apisdorf et al. |
| 6,600,594 B1 | 7/2003 | Ko et al. |
| 6,748,169 B1 | 6/2004 | Geiger et al. |
| 6,839,523 B1 | 1/2005 | Roberts |
| 7,187,861 B2 | 3/2007 | Ruchet |
| 7,254,325 B2 | 8/2007 | Hoshida |
| 7,995,915 B2 | 8/2011 | Ruchet et al. |
| 8,699,884 B2 * | 4/2014 | Toyomaki .......... H04B 10/0773 398/83 |
| 8,861,953 B2 | 10/2014 | Ruchet et al. |
| 9,287,974 B2 | 3/2016 | Ruchet et al. |
| 2001/0048537 A1 | 12/2001 | Sussman |
| 2005/0286895 A1* | 12/2005 | Lee .......................... H04J 14/02 398/79 |
| 2008/0131116 A1 | 6/2008 | Nakamura |
| 2011/0058810 A1 | 3/2011 | Lee et al. |
| 2011/0103792 A1* | 5/2011 | Kimura ................ H04B 10/032 398/2 |
| 2014/0363157 A1 | 12/2014 | Ruchet et al. |
| 2015/0229389 A1* | 8/2015 | Kim ...................... H04B 10/073 398/17 |
| 2016/0197674 A1 | 7/2016 | Ruchet et al. |
| 2017/0054497 A1 | 2/2017 | Nikolaevich |
| 2017/0201320 A1* | 7/2017 | Prause ............. H04B 10/07955 |

FOREIGN PATENT DOCUMENTS

| | | |
|---|---|---|
| EP | 0652651 B1 | 1/2002 |
| WO | 199967609 A1 | 12/1999 |
| WO | 0013350 A2 | 3/2000 |
| WO | 200133746 A2 | 5/2001 |
| WO | 200176109 A1 | 10/2001 |

OTHER PUBLICATIONS

Acterna launches premium-class all-in-one optical handheld instrument; Optical Level Controller (OLC)-65 enables system installation, maintenance and troubleshooting in the field.; Goliath Business Knowledge On Demand; Jun. 4, 2003; M2 Communications Ltd.

Acterna OLC-65 Optical Level Controller, V 1.00 Operating Manual BN 2276/01, Series A; Copyright 2003.

Acterna optical handheld testers—Optical power meters, attenuators, light sources; Acterna Communications Test and Management Solutions; Date: Unknown; Applicant Admitted Prior Art.

Annotated—Acterna OLC-65 Optical Level Controller, V 1.00 Operating Manual BN 2276/01, Series A; Copyright 2003.

Cleary, David; Fundamentals of a Passive Optical Network (PON); Optical Solutions, Inc.; Date: Unknown; Applicant Admitted Prior Art.

Dutton, Harry J.R.; IBM Understanding Optical Communications; International Technical Support Organization, Sep. 1998, pp. 185-193, 228, 237, and 420-422.

Extended European Search Report for Application No. 16189587.5 dated Feb. 21, 2017.

Fiber Taps Installation and User's Guide; Doc. No. P/N 1015503, RevB; pp. 1-14; May 2003; Finisar.

George, John E.; Optical System Design Considerations for FTTP Networks; FTTH Conference; 2003; p. 1-p. 10.

Greenfield, David; Passive Optical Networks; Dec. 5, 2001.

GT-C Gigabit Ethernet Traffic Checker; May 1999; Finisar.

Hewlett-Packard Journal; Jan. 1985; vol. 36, No. 1.

ITU-T L.40: Series L: Construction, Installation and Protection of Cables and Other Elements of Outside Plant: Optical fibre outside plant maintenance support, monitoring and testing system; Oct. 2000; International Telecommunication Union.

ITU-T Recommendation G.957: Optical interfaces for equipments and systems relating to the synchronous digital hierarchy; Mar. 2006; International Telecommunication Union.

ITU-T Recommendation G.983.1: Broadband optical access systems based on Passive Optical Networks (PON): Jan. 2005; International Telecommunication Union.

Maeda, Yoichi; B-PON conformance test results in Makuhari, Japan; Presentation Slides; Apr. 3, 2004.

OLC-65 Block Service, Jun. 2003.

OLC-65 Lieferschein-Siemens, Aug. 2003.

PHOTON Field test: Experience using a combination of optical measurements and SDH analysis; Date: Unknown; Applicant Admitted Prior Art.

Rossi, Giammarco et al.; Optical Performance Monitoring in Reconfigurable WDM Optical Networks Using Subcarrier Multiplexing; Journal of Lightwave Technology; vol. 18, No. 12; Dec. 2000.

Throughput is essential in production; Power Meter R&S NRP; pp. 7-10; Date: Unknown; Applicant Admitted Prior Art.

Tomita, Nobuo et al.; Design and Performance of a Novel Automatic Fiber Line Testing System with OTDR for Optical Subscriber Loops; Journal of Lightwave Technology; vol. 12, No. 5; May 1994; pp. 717-726.

White Paper: The Pros and Cons of Tapping and Minoring; Nov. 2002; Finisar.

File History from U.S. Appl. No. 15/263,986 entitled Optical Power Measurement in a Passive Optical Network; filed Sep. 13, 2016; Applicant: EXFO Inc.

\* cited by examiner

OPTICAL POWER MEASUREMENT IN A PASSIVE OPTICAL NETWORK

This patent application is a continuation-in-part of U.S. patent application Ser. No. 15/263,986 filed Sep. 13, 2016, now pending, which claims priority to U.S. Provisional Patent Application Ser. Nos. 62/221,678, filed Sep. 22, 2015, and 62/288,199, filed Jan. 28, 2016. The entirety of each of these related patent applications is incorporated by reference herein.

TECHNICAL FIELD

The technical field generally relates to passive optical networks (PONs), and more particularly, to a device and method for optical power measurement in a PON.

BACKGROUND

Optical fiber networks lie at the core of modern telecommunications. As the cost of optical fibers and associated components decreases, network architectures increasingly use optical fibers from the edge of a core network to a location at or very close to the end users. Such implementations are referred to as "fiber to the X" (FTTX), where X can stand for the home (FTTH), office (FTTO), building (FTTB), curb (FTTC), premises (FTTP), etc. For cost considerations, FTTX solutions are generally deployed with passive optical network (PON) architectures in which data, voice, video and other services are conveyed to the end users through passive splitting, rather than active switching, devices.

A PON generally consists of one or more optical line terminals (OLTs), typically located in a service provider's central office, a number of optical network terminals (ONTs) or units (ONUs), typically located near the end users, and an optical distribution network (ODN) including optical fibers to connect the OLTs to the ONTs and supplemented with power and wavelength splitters, filters and other passive optical devices. Many PON protocols have been developed by standard bodies such as the International Telecommunication Union (ITU) and the Institute of Electrical and Electronics Engineers (IEEE). Non-limiting examples of PON protocols include: asynchronous transfer mode PON (APON); broadband PON (BPON); gigabit-capable PON (GPON); Ethernet PON (EPON); 10-gigabit-capable PON (10G-PON or XG-PON); and next-generation PON 2 (NG-PON2). It is to be noted that for simplicity, the term "ABG-PON" will be used herein to encompass APON, BPON, GPON and other older-generation "legacy" PONs that use the 1490 nanometer (nm) wavelength for downstream traffic and the 1310 nm wavelength for upstream traffic.

PONs involve bidirectional single-fiber communication between pairs of network elements, in which one network element in each pair is configured to interrupt signal transmission if the optical link between the two network elements is broken. Because of this, optical power measurement of PON signals is generally performed with special-purpose or dedicated power meter instruments. These instruments are configured to ensure that transmission of one of the communication signals is maintained while attempting to measure the optical power of the other, counterpropagating signal.

FIG. 1 illustrates an example of a conventional PON power meter (PPM) design suitable for legacy PONs. Other implementations of such a PPM design are described, for instance, in U.S. Pat. Nos. 7,187,861; 7,995,915; 8,861,953; and 9,287,974, the disclosures of which are incorporated herein by reference in their entirety. However, while the PPM design shown in FIG. 1 can be advantageous in many applications, it is generally unable to distinguish among multiple downstream OLT signals propagating in different data-carrying wavelength-division-multiplexing (WDM) channels (aside from a possible signal centered near 1550 nm, for example a CATV signal, which can be selected with a bandpass optical filter). This PPM design is also generally unable to identify the particular downstream WDM or dense WDM (DWDM) wavelength associated with the ONT for which power measurements are performed.

In NG-PON2, the optical transmission path between an OLT and an ONT may carry multiple downstream optical signals in respective WDM channels. However, the number of these downstream signals propagating in a given optical transmission is, in general, not known precisely. Also, despite the presence of multiple downstream WDM channels, generally only a single one of these channels is actually read or listened to by the ONT, the wavelength of which being generally unknown or not readily accessible to the PPM and/or the operator tasked to troubleshoot or assess conformity of the communication link between the OLT and the ONT. In such a case, conventional legacy PPMs are limited to measuring only the total optical power carried by all of the downstream optical signals forming the downstream light, which is generally insufficient to confirm whether the WDM channel actually read by the ONT is present, let alone to indicate its optical power.

Furthermore, PPM designs such as shown in FIG. 1 are generally not well adapted for optical power measurement in next-generation, multiple-wavelength PON systems, such as NG-PON2, involving both time and wavelength division multiplexing (TWDM) in both the downstream and upstream directions. The NG-PON2 architecture is specified in the ITU-T G.989 family of recommendations, including ITU-T G.989.1 and G.989.2. For example, the ITU-T G.989.2 recommendation specifies different operation modes for NG-PON2, including a TWDM PON operation mode, in which each ONT may communicate with multiple OLTs, and a point-to-point (PtP) WDM PON operation mode. For some applications, a PPM suitable for NG-PON2 networks may need to accommodate both of these two operation modes.

NG-PON2 is also backward-compatible with legacy PON architectures such as GPON and XG-PON, RF video overlay, and optical time-domain reflectometer (OTDR) measurements (see, e.g., the ITU-T G989.2 recommendation for NG-PON2, as well as the ITU-T G.984 and ITU-T G.987 families of recommendations for GPON and XG-PON, respectively). In particular, different legacy PON architectures and different NG-PON2 architectures can coexist on a given PON. In this context, it would be inconvenient, time-consuming and/or error-prone to require the operator to reconfigure a PPM before each measurement in accordance with the particular PON architecture at the OLT currently being tested.

Accordingly, various challenges remain in the development of PPMs that can allow optical power measurement of communication signals in multiple-wavelength PON systems.

SUMMARY

According to an aspect, there is provided a device for optical power measurement in an optical network supporting upstream and downstream signal propagation along an optical transmission path. The device includes:

an upstream wavelength analyzer receiving upstream light extracted from the optical transmission path and configured to determine an upstream spectral characteristic of the extracted upstream light;

a downstream filter assembly receiving downstream light extracted from the optical transmission path and configured to spectrally split the extracted downstream light into a plurality of downstream filtered signals, one of which corresponding to a downstream signal of interest;

a processing unit configured to identify, based on the upstream spectral characteristic, the downstream signal of interest among the plurality of downstream filtered signals; and a downstream optical power meter assembly coupled to the downstream filter assembly and configured to measure an optical power parameter of the downstream signal of interest.

In some implementations, the upstream wavelength analyzer is configured to output the upstream spectral characteristic as a detection signal corresponding to a wavelength value of the extracted upstream light.

In some implementations, the upstream wavelength analyzer is configured to output the upstream spectral characteristic as a detection signal conveying information about a presence of the extracted upstream light in a specific upstream spectral range.

In some implementations, the specific upstream spectral range corresponds to one among a first upstream spectral band ranging from about 1260 nm to 1280 nm, a second upstream spectral band ranging from about 1290 nm to about 1330 nm, and a third upstream spectral band ranging from about 1524 nm to about 1544 nm.

In some implementations, the processing unit is configured to identify the downstream signal of interest among the plurality of downstream filtered signals by determining an expected value of a spectral position of the downstream signal of interest.

In some implementations, the processing unit is configured to identify the downstream signal of interest among the plurality of downstream filtered signals by determining an expected downstream spectral range in which to find the downstream signal of interest.

In some implementations, the expected downstream spectral range corresponds to one among a first downstream spectral band ranging at least from 1575 nm to about 1580 nm, a second downstream spectral band ranging from about 1480 nm to about 1500 nm, a third downstream spectral band ranging from about 1550 nm to about 1560 nm, and a fourth downstream spectral band ranging from about 1596 nm to about 1603 nm.

In some implementations, the optical network supports coexistence of at least a first network standard and a second network standard, the first and second network standards having spectrally distinct first and second upstream transmission bands, and the upstream wavelength analyzer includes:

an upstream optical power splitter assembly configured to split the extracted upstream light into a first upstream light component and a second upstream light component;

an upstream filter assembly configured to filter, as a filtered upstream signal, the second upstream light component in a passband containing only one of the first and second upstream transmission bands; and an upstream detection assembly configured to measure a first optical power parameter of the first upstream light component and a second upstream optical power parameter of the filtered upstream signal, the upstream detection assembly generating a detection signal based on the first and second optical power parameters, the detection signal being indicative of the upstream spectral characteristic and conveying information about a presence of the upstream light in one of the first and second upstream transmission bands.

In some implementations, the first upstream transmission band ranges from about 1524 nm to about 1544 nm and the second upstream transmission band ranges from about 1290 nm to about 1330 nm.

In some implementations, when the extracted upstream light is found to be present in the first upstream transmission band, the processing unit determines that the downstream signal of interest lies in a first downstream transmission band ranging from about 1596 nm to about 1603 nm; and, when the extracted upstream light is found to be present in the second upstream transmission band, the processing unit determines that the downstream signal of interest lies in a second downstream transmission band ranging from about 1480 nm to about 1500 nm.

In some implementations, the first upstream transmission band ranges from about 1260 nm to about 1280 nm and the second upstream transmission band ranges from about 1290 nm to about 1330 nm.

In some implementations, when the extracted upstream light is found to be present in the first upstream transmission band, the processing unit determines that the downstream signal of interest lies in a first downstream transmission band ranging from about 1575 nm to about 1580 nm; and, when the extracted upstream light is found to be present in the second upstream transmission band, the processing unit determines that the downstream signal of interest lies in a second downstream transmission band ranging from about 1480 nm to about 1500 nm.

In some implementations, the optical network supports coexistence of at least a first network standard and a second network standard, the first network standard having a first upstream transmission band ranging from about 1524 nm to about 1544 nm and the second network standard having a second upstream transmission band ranging from about 1290 nm to about 1330 nm. When the extracted upstream light is found to be present in the first upstream transmission band, the processing unit determines that the downstream signal of interest lies in a first downstream transmission band ranging from about 1596 nm to about 1603 nm, and when the extracted upstream light is found to be present in the second upstream transmission band, the processing unit determines that the downstream signal of interest lies in a second downstream transmission band ranging from about 1480 nm to about 1500 nm.

According to another aspect, there is provided a method for optical power measurement in an optical network supporting upstream and downstream signal propagation along an optical transmission path. The method includes:

receiving upstream light extracted from the optical transmission path;

determining an upstream spectral characteristic of the extracted upstream light;

receiving downstream light extracted from the optical transmission path;

spectrally splitting the extracted downstream light into a plurality of downstream filtered signals, one of which corresponding to a downstream signal of interest;

identifying, based on the upstream spectral characteristic, the downstream signal of interest among the plurality of downstream filtered signals; and measuring an optical power parameter of the downstream signal of interest.

In some implementations, determining the upstream spectral characteristic includes generating a detection signal corresponding to a wavelength value of the extracted upstream light.

In some implementations, determining the upstream spectral characteristic includes generating a detection signal conveying information about a presence of the extracted upstream light in a specific upstream spectral range.

In some implementations, identifying the downstream signal of interest among the plurality of downstream filtered signals includes determining an expected value of a spectral position of the downstream signal of interest.

In some implementations, identifying the downstream signal of interest among the plurality of downstream filtered signals includes determining an expected downstream spectral range in which to find the downstream signal of interest.

In some implementations, the optical network supports coexistence of at least a first network standard and a second network standard, the first and second network standards having spectrally distinct first and second upstream transmission bands. In such implementations the method further includes:

splitting the extracted upstream light into a first upstream light component and a second upstream light component;

filtering, as a filtered upstream signal, the second upstream light component in a passband containing only one of the first and second upstream transmission bands;

measuring a first optical power parameter of the first upstream light component and a second upstream optical power parameter of the filtered upstream signal; and generating a detection signal based on the first and second optical power parameters, the detection signal being indicative of the upstream spectral characteristic and conveying information about a presence of the upstream light in one of the first and second upstream transmission bands.

In some implementations, the first upstream transmission band ranges from about 1524 nm to about 1544 nm, and the second upstream transmission band ranges from about 1290 nm to about 1330 nm. In such implementations, the method further includes: determining that the downstream signal of interest lies in a first downstream transmission band ranging from about 1596 nm to about 1603 nm when the extracted upstream light is found to be present in the first upstream transmission band; and determining that the downstream signal of interest lies in a second downstream transmission band ranging from about 1480 nm to about 1500 nm when the extracted upstream light is found to be present in the second upstream transmission band.

In some implementations, the first upstream transmission band ranges from about 1260 nm to about 1280 nm, and the second upstream transmission band ranges from about 1290 nm to about 1330 nm. In such implementations, the method further includes: determining that the downstream signal of interest lies in a first downstream transmission band ranging from about 1575 nm to about 1580 nm when the extracted upstream light is found to be present in the first upstream transmission band; and determining that the downstream signal of interest lies in a second downstream transmission band ranging from about 1480 nm to about 1500 nm when the extracted upstream light is found to be present in the second upstream transmission band.

In some implementations, the optical network supports coexistence of at least a first network standard and a second network standard, the first network standard having a first upstream transmission band ranging from about 1524 nm to about 1544 nm and the second network standard having a second upstream transmission band ranging from about 1290 nm to about 1330 nm. In such implementations, the method further includes: determining that the downstream signal of interest lies in a first downstream transmission band ranging from about 1596 nm to about 1603 nm when the extracted upstream light is found to be present in the first upstream transmission band; and determining that the downstream signal of interest lies in a second downstream transmission band ranging from about 1480 nm to about 1500 nm when the extracted upstream light is found to be present in the second upstream transmission band.

According to another aspect, there is provided a device for optical power measurement along an optical transmission path between a first network element and a second network element, the optical transmission path supporting bidirectional propagation of downstream light and upstream light, the downstream light including a plurality of downstream signals having mutually different central wavelengths. The device includes:

an optical power splitter assembly configured to extract, from the optical transmission path, a portion of the downstream light and a portion of the upstream light;

an upstream wavelength analyzer configured to receive the extracted portion of the upstream light and determine therefrom an upstream spectral characteristic of the upstream light;

a processing unit coupled to the upstream wavelength analyzer and configured to determine, based on the upstream spectral characteristic, a downstream spectral characteristic of a downstream signal of interest among the plurality of downstream signals;

a downstream filter assembly configured to receive and filter the extracted portion of the downstream light to select therefrom a portion of the downstream signal of interest according to the determined downstream spectral characteristic; and a downstream optical power meter assembly configured to measure an optical power parameter of the portion of the downstream signal of interest selected by the downstream filter assembly.

In some implementations, the upstream wavelength analyzer is configured to determine the upstream spectral characteristic as a value of a central wavelength of the upstream light, and the processing unit is configured to determine the downstream spectral characteristic as a value of a central wavelength of the downstream signal of interest.

In some implementations, the processing unit is configured to determine the value of the central wavelength of the downstream signal of interest from reference data relating a set of possible central wavelength values for the upstream light to a set of possible central wavelength values for the downstream signal of interest.

In some implementations, the downstream filter assembly has a passband central wavelength tunable to the determined value of the central wavelength of the downstream signal of interest.

In some implementations, the tunable passband central wavelength is tunable in a wavelength range extending at least from 1524 nm to 1625 nm.

In some implementations, the tunable passband central wavelength is tunable in a wavelength range extending at least from 1596 nm to 1603 nm.

In some implementations, the upstream wavelength analyzer is configured to monitor a presence of the upstream light in each of a plurality of distinct upstream spectral bands and, upon detection of the presence of the upstream light in one of the plurality of distinct upstream spectral bands, to generate a detection signal indicative of the upstream spectral characteristic.

In some implementations, the plurality of distinct upstream spectral bands includes a first upstream spectral band ranging at least from 1260 nm to 1280 nm, a second upstream spectral band ranging at least from 1290 nm to 1330 nm, and a third upstream spectral band ranging at least from 1524 nm to 1625 nm.

In some implementations, the detection signal provides a value of a central wavelength of the upstream light.

In some implementations, the detection signal is indicative of a value of a central wavelength of the upstream light, the downstream filter assembly has a tunable passband central wavelength, and the processing unit is configured to determine a value of a central wavelength of the downstream signal of interest based on the value of the central wavelength of the upstream light, the tunable passband central wavelength of the downstream filter assembly being tuned to the determined value of the central wavelength of the downstream signal of interest.

In some implementations, the upstream wavelength analyzer includes:
  an upstream filter assembly configured to filter the extracted portion of the upstream light according to a plurality of passbands corresponding to the plurality of distinct upstream spectral bands; and
  an upstream detection assembly including a plurality of upstream detection circuits, each detection circuit being configured to receive a filtered signal from the upstream filter assembly in a respective one of the plurality of passbands and to generate the detection signal indicative of the upstream spectral characteristic upon detection of the presence of the upstream light in the respective one of the plurality of passbands.

In some implementations, at least one of the plurality of upstream detection circuits is configured to generate, as the detection signal, a signal representative of the presence of the filtered signal from the upstream filter assembly in the respective passband, while the remainder of the plurality of upstream detection circuits is configured to generate, as the detection signal, a central wavelength of the filtered signal received from the associated optical filter.

In some implementations of the device:
  the downstream filter assembly is configured to spectrally split the extracted portion of the downstream light according to a plurality of downstream spectral bands; and
  the downstream optical power meter assembly includes a plurality of power meter devices, each power meter device being configured to measure an optical power parameter of a filtered signal received from the downstream filter assembly in a corresponding one of the downstream spectral bands, one of the optical power parameters measured by the power meter devices corresponding to the optical power parameter of the portion of the downstream signal of interest.

In some implementations, the processing unit is configured to identify, based on the determined downstream spectral characteristic, the optical power parameter corresponding to the optical power parameter of the portion of the downstream signal of interest.

In some implementations of the device:
  the downstream signal of interest and the downstream spectral characteristic are respectively a first downstream signal of interest and a first downstream spectral characteristic;
  the processing unit is configured to determine, based on the upstream spectral characteristic, an additional downstream spectral characteristic of an additional downstream signal of interest among the plurality of downstream signals, the first and the additional downstream signals of interest lying in different ones of the downstream spectral bands; and
  the optical power parameter measured by another one of the power meter devices corresponds to an optical power parameter of a portion of the additional downstream signal of interest.

In some implementations, the plurality of downstream spectral bands includes a first downstream spectral band ranging at least from 1575 nm to 1580 nm, a second downstream spectral band ranging at least from 1480 nm to 1500 nm, a third downstream spectral band ranging at least from 1550 nm to 1560 nm, and a fourth downstream spectral band ranging at least from 1596 nm to 1603 nm.

In some implementations, the device includes first and second connector ports connected to the optical power splitter assembly for serially inserting the device in the optical transmission path between the first and the second network elements.

In some implementations, the upstream wavelength is configured to measure an optical power parameter and/or an upstream transmission bitrate associated with the upstream light.

According to another aspect, there is provided a device for optical power measurement along an optical transmission path between a first network element and a second network element, the optical transmission path supporting bidirectional propagation of downstream light and upstream light, the downstream light including a plurality of downstream signals having mutually different central wavelengths. The device includes:
  an optical power splitter assembly configured to extract, from the optical transmission path, a portion of the downstream light and a portion of the upstream light;
  an upstream wavelength analyzer configured to receive the extracted portion of the upstream light from the optical power splitter assembly and to measure therefrom a value of a central wavelength of the upstream light;
  a downstream filter assembly configured to receive and filter the extracted portion of the downstream light to select therefrom a portion of the downstream signal of interest, the downstream filter assembly having a tunable passband central wavelength;
  a processing unit coupled to the upstream wavelength analyzer and the downstream filter assembly, the processing unit being configured to determine, from the measured value of the central wavelength of the upstream light, a value of a central wavelength of a downstream signal of interest among the plurality of downstream signals, the tunable passband central wavelength of the downstream filter assembly being tuned to the determined value of the central wavelength of the downstream signal of interest, thereby selecting the portion of the downstream signal of interest; and
  a downstream optical power meter assembly configured to measure an optical power parameter of the portion of the downstream signal of interest selected by the downstream filter assembly.

In some implementations, the tunable passband central wavelength of the downstream filter assembly is tunable in a wavelength range extending at least from 1524 nm to 1625 nm.

In some implementations, the tunable passband central wavelength of the downstream filter assembly is tunable in a wavelength range extending at least from 1596 nm to 1603 nm.

According to another aspect, there is provided a method for optical power measurement along an optical transmission path between a first network element and a second network element, the optical transmission path supporting bidirectional propagation of downstream light and upstream light, the downstream light including a plurality of downstream signals having mutually different central wavelengths. The method includes:

extracting, from the optical transmission path, a portion of the downstream light and a portion of the upstream light;

determining, from the extracted portion of the upstream light, an upstream spectral characteristic of the upstream light;

determining, based on the upstream spectral characteristic, a downstream spectral characteristic of a downstream signal of interest among the plurality of downstream signals;

filtering the extracted portion of the downstream light to select therefrom a portion of the downstream signal of interest according to the determined downstream spectral characteristic; and measuring an optical power parameter of the selected portion of the downstream signal of interest.

In some implementations, determining the upstream spectral characteristic includes measuring a value of a central wavelength of the upstream light, and determining the downstream spectral characteristic includes determining a value of a central wavelength of the downstream signal of interest.

In some implementations, determining the value of the central wavelength of the downstream signal of interest includes accessing reference data relating a set of possible central wavelength values for the upstream light to a set of possible central wavelength values for the downstream signal of interest.

In some implementations, filtering the extracted portion of the downstream light includes tuning a passband center wavelength to the determined value of the central wavelength of the downstream signal of interest.

In some implementations, tuning the passband center wavelength includes tuning the passband center wavelength in a wavelength range extending at least from 1524 nm to 1625 nm.

In some implementations, tuning the passband center wavelength includes tuning the passband center wavelength in a wavelength range extending at least from 1596 nm to 1603 nm.

In some implementations, determining the upstream spectral characteristic includes monitoring a presence of the upstream light in each of a plurality of distinct upstream spectral bands and, upon detection of the presence of the upstream light in one of the upstream spectral bands, generating a detection signal indicative of the upstream spectral characteristic.

In some implementations of the method:

filtering the extracted portion of the downstream light includes spectrally splitting the extracted portion of the downstream light into a plurality of downstream spectral bands; and measuring the optical power parameter of the portion of the downstream signal of interest includes measuring an optical power parameter of a filtered signal in each of the downstream spectral bands, one of the optical power parameters measured by the power meter devices corresponding to the optical power parameter of the portion of the downstream signal of interest.

In some implementations, the method further includes identifying, based on the determined downstream spectral characteristic, the one of the optical power parameters measured by the power meter devices corresponding to the optical power parameter of the portion of the downstream signal of interest.

According to another aspect, there is provided a PPM that identifies an actual mode of operation being used and auto-adapts to perform the proper measurement as a function of the identified mode. This may be performed by identifying the wavelength or wavelength range of the ONT upstream signal(s).

According to another aspect, there is provided a device for measuring along an optical transmission path a parameter of at least one of optical signals propagating concurrently in opposite directions between a first network element and a second network element, the device including: a wavelength-meter receiving an extracted portion of light propagating upstream along the optical transmission path, for measuring a wavelength of an upstream optical signal; a processing unit to determine an expected WDM channel of a downstream signal from the measured wavelength of said upstream optical signal and preset network configuration data; an optical filter receiving an extracted portion of light propagating downstream along the optical transmission path to select in said extracted portion of light propagating downstream, said downstream optical signal; and a power meter receiving the selected downstream optical signal to measure an optical power value associated thereto.

In some implementations, the optical filter is tunable to the expected WDM channel.

According to another aspect, there is provided a method for measuring along an optical transmission path a parameter of at least one of optical signals propagating concurrently in opposite directions between a first network element and a second network element, the method including: measuring a wavelength of an upstream optical signal; determining an expected WDM channel of a downstream signal from the measured wavelength of said upstream optical signal and preset network configuration data; filtering an extracted portion of light propagating downstream along the optical transmission path to select the downstream optical signal; and measuring an optical power value associated with the downstream optical signal.

In some implementations, the first network element transmits a downstream optical signal in a first WDM channel, the second network element transmits an upstream optical signal in a second WDM channel, and the optical transmission path may also carry other downstream optical signals in other WDM channels.

Other features and advantages of the techniques described herein will be better understood upon reading of exemplary embodiments thereof with reference to the appended drawings.

DETAILED DESCRIPTION

Figure 1:
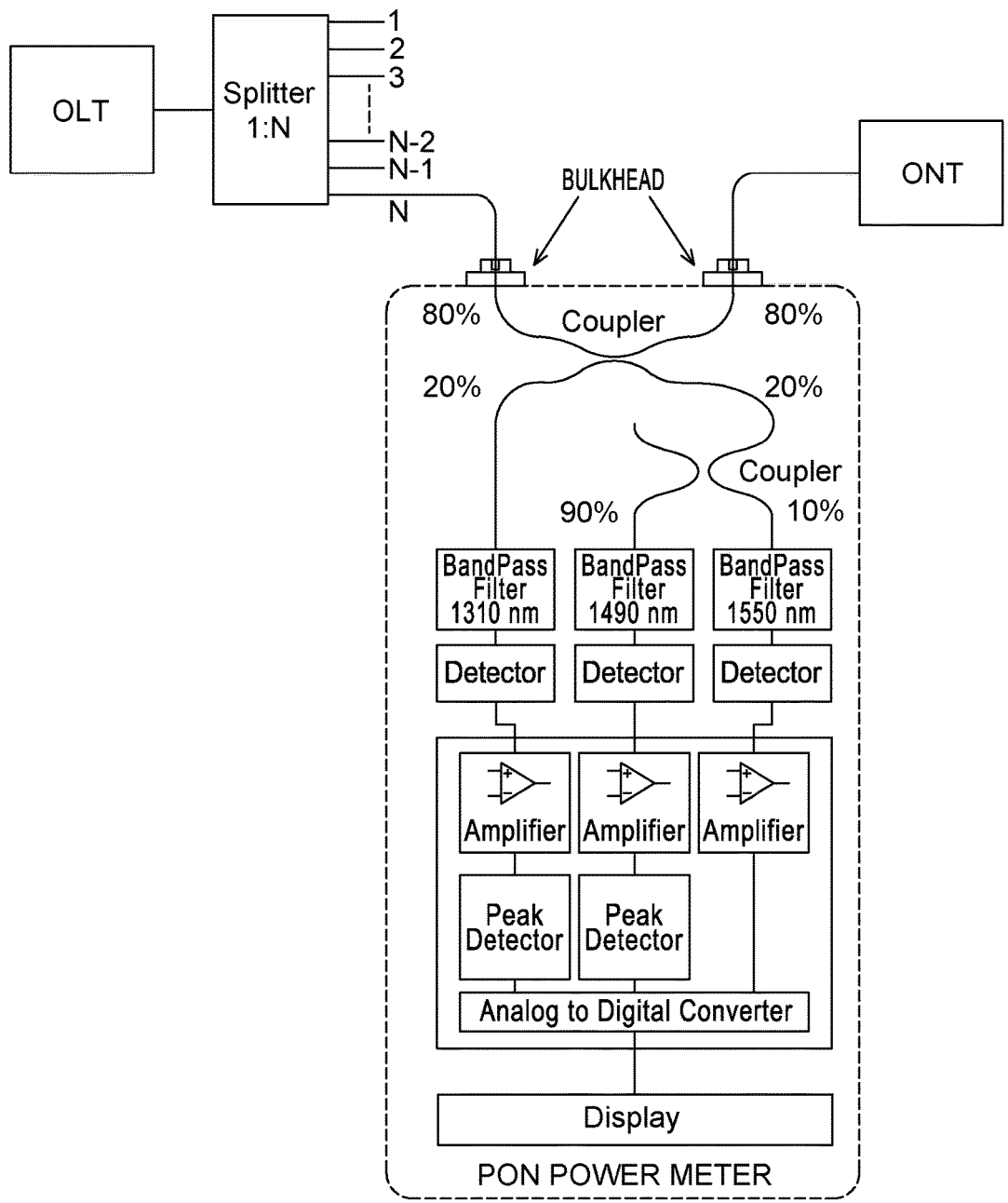
FIG. 1 (PRIOR ART) is a schematic block diagram of a conventional PPM suitable for optical power measurement in a legacy PON system.

In the following description, similar features in the drawings have been given similar reference numerals, and, to not unduly encumber the figures, some elements may not be indicated on some figures if they were already identified in one or more preceding figures. It should also be understood herein that the elements of the drawings are not necessarily depicted to scale, since emphasis is placed upon clearly illustrating the elements and structures of the present embodiments. Some optical, electrical and/or mechanical elements may also be omitted on some or all of the figures in order to emphasize inventive aspects of the illustrated embodiments.

The present description generally relates to a device and method for optical power measurement along an optical transmission path between a first network element and a second network element of an optical network.

The present techniques can be useful in applications where it is desirable or required to provide on-site optical power measurement of PON signals in multiple-wavelength PON networks to ensure that the network is reliable and that it operates within acceptable industry specifications. The present techniques can be field portable and be implemented in various environments and settings, including field-deployed networks, manufacturing facilities for network equipment, research and development laboratories, and the like. The present techniques can be employed during the installation, activation and/or operation phases of the network for the purpose of optical characterization, error diagnosis and troubleshooting, and/or performing monitoring.

As known in the art, a PON is a communication network that does not require active components to convey communication signals between network elements. A PON is typically composed of one or more OLTs located at a service provider's central office or hub, a number of ONTs located at or near respective customers' premises, and an ODN between them. The OLTs and the ONTs include optical transmitters and receivers to allow simultaneous, bidirectional transmission of downstream and upstream traffic. Generally, OLTs are responsible for allocating upstream bandwidth to the ONTs in order to prevent interference between upstream signals originating from different ONTs. As a result, ONTs are configured to transmit upstream data only if they receive OLT downstream data. For this reason, conventional PPM devices used in legacy PON systems are configured to perform optical power testing while maintaining OLT-to-ONT communications.

As mentioned above, a limitation of these conventional PPM devices is that they generally cannot distinguish among multiple downstream signals propagating at different wavelengths, let alone identify the wavelength or wavelength range of the one among the downstream signals actually read by the ONT being tested. This limitation can make conventional PPM devices impractical for use in next-generation, multiple-wavelength PON systems, such as NG-PON2. In order to try to address or at least alleviate these issues, the present techniques aim to provide a device and method for optical power measurement suitable for implementation in multiple-wavelength PON systems, including NG-PON2 systems, NG-PON2 systems with coexistence of one or more legacy PON systems, and other next-generation PON systems.

As described in greater detail below, the present techniques can involve identifying the spectral region containing the upstream signal originating from the ONT under test so as to provide knowledge about the spectral region in which to find the downstream signal read by this ONT, whose optical power is to be measured. The identification of the spectral region in which the upstream signal is contained can also provide information about the operation mode, or PON protocol, of the ONT under test (e.g., NG-PONG2, XG-PON or ABG-PON). In particular, implementations described herein can provide "auto-discovery" or "network-aware" capabilities, with which the PPM device can configure itself based on the information about the operation mode implemented in the ONT under test derived from the spectral analysis of its upstream signal.

First Embodiment of a Device for Optical Power Measurement

Figure 2:
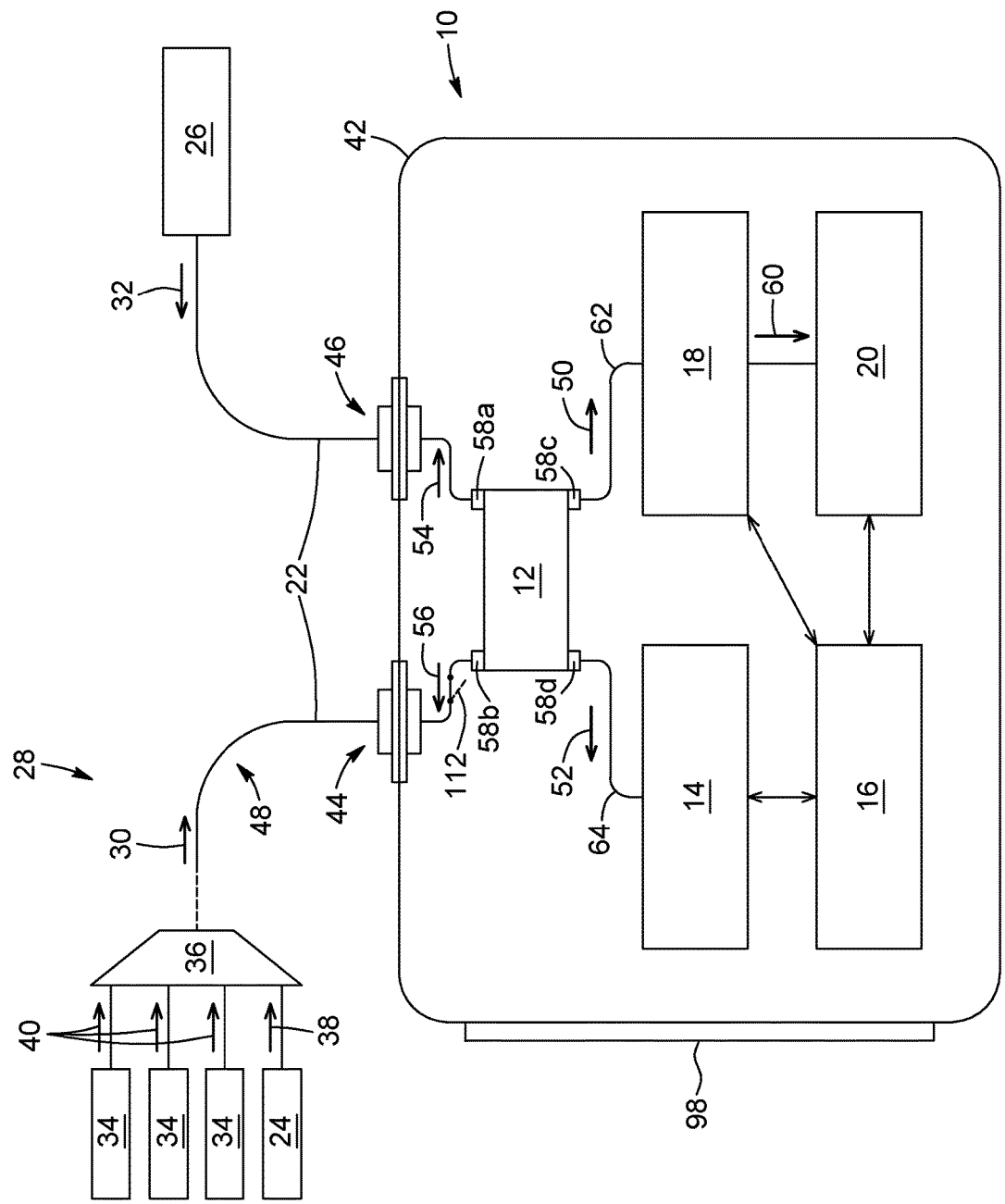
FIG. 2 is a schematic block diagram of a device for optical power measurement in a multiple-wavelength PON system shown along with elements of the PON system, in accordance with a first exemplary embodiment.

Referring to FIG. 2, there is illustrated a first exemplary embodiment of a device 10, which is operable as a PON power meter. As discussed below, the device 10 generally includes four main components, namely an optical power splitter assembly 12, an upstream wavelength analyzer 14, a processing unit 16, a downstream filter assembly 18, and a downstream optical power meter assembly 20.

As shown in FIG. 2, the device 10 can be used for optical power measurement along an optical transmission path 22 extending between a first network element 24 and a second network element 26 in a PON 28. The optical transmission path supports concurrent, bidirectional propagation of downstream light 30 and upstream light 32. In the illustrated embodiment, the first network element 24 and the second network element 26 are respectively embodied by an OLT and an ONT.

It is to be noted that throughout the present description, the terms "light" and "optical" are understood to refer to radiation in any appropriate region of the electromagnetic spectrum. In particular, the terms "light" and "optical" are not limited to visible light, but can include, for example, the infrared wavelength range. For example, in some embodiments, the downstream light and the upstream light carried on the optical transmission path may each have a wavelength lying within a range from about 1200 nm to 1700 nm, which encompasses the near-infrared transmission window for optical telecommunication applications. Of course, other wavelength ranges may be considered in other embodiments without departing from the scope of the present techniques.

In operation, the first and the second network elements 24, 26 are in data communication with each other. More specifically, this means that, during testing, the first network element 24 (i.e., the OLT in FIG. 2) generates a downstream signal along the optical transmission path 22. This downstream signal is received and read by the second network element 26 (i.e., the ONT in FIG. 2). In response, the second network element 26 generates an upstream signal along the optical transmission path 22, and this upstream signal is received and read by the first network element 24. It is to be noted that, for convenience, the first and the second network elements 24, 26 may in some instances be referred to respectively as the "upstream" and the "downstream" network elements, hence reflecting their relative positioning in the PON 28.

In FIG. 2, the PON 28 is a multiple-wavelength PON, for example implementing NG-PON2 with or without coexisting legacy PON architectures. By way of example, in the illustrated embodiment, the PON 28 includes four OLTs, of which one corresponds to the first network element 24 and the others are designated by reference numeral 34. However, for simplicity, only one ONT is shown in FIG. 2, namely the second network element 26. Indeed, in a typical PON system, the upstream signal from a particular ONT is multiplexed with the upstream signals from other ONTs at an optical combiner, for instance, disposed between the ONTs and the OLTs, typically upstream with respect to the device 10.

In general, each OLT in a multiple-wavelength PON is operable in a particular operation mode (e.g., NG-PONG2, XG-PON or ABG-PON) and at a particular wavelength or wavelength range. The downstream signals generated by the four OLTs can be combined with an OLT signal combiner 36, for example a wavelength multiplexer. The combined OLT signals form the downstream light 30 propagating along the optical transmission path 22 toward the second network element 26. This means that the downstream light 30 generally includes a plurality of downstream signals having mutually different central wavelengths.

Providing a plurality of OLTs makes it possible for each ONT in the network to access downstream signals of different wavelengths or wavelength ranges although at any given time each ONT is in two-way communication with only one of the OLTs. Accordingly, the downstream light 30 propagating along the optical transmission path 22 in FIG. 2 generally includes not only the downstream signal of interest 38 transmitted by the first network element 24, but also other downstream signals 40 originating from the remaining OLTs 34. However, since only the downstream signal of interest 38 is actually read by the second network element 26, the other downstream signals 40 being filtered out of the downstream light 30 upon reaching the second network element 26, it is only this signal 38 which is relevant during optical power testing. Because of this, the present description provides a technique for extracting the downstream signal of interest 38 from the downstream light 30 and measuring its optical power in order to assess network performance and integrity.

Referring still to FIG. 2, the device 10 can include a housing 42 to accommodate therein various device components. In some implementations, the device 10 is portable to allow field-deployed PON testing. In such a case, the housing 42 can be ergonomically sized and shaped to facilitate holding, moving and operating of the device 10 using one or both hands of an operator. The housing 42 may be made of a lightweight yet sturdy material, for example molded plastic.

The housing 42 is generally provided with a first connector port 44 and a second connector port 46, for example bulkhead connector ports or other suitable types of connector ports. The first and the second connector ports 44, 46 are connected to the optical power splitter assembly 12 for serially inserting the device 10 in the optical transmission path 22 between the first and the second network elements 24, 26. More specifically, inserting the device 10 in the optical transmission path 22 can involve disconnecting an optical fiber link 48 at a testing point along the optical transmission path 22. The testing point can be located at an existing connectorized coupler close to the second network element 26, typically at the customer's premise and downstream of any optical combiner that combines the upstream signal from the second element 26 with the upstream signals from other ONTs. Once the optical fiber link 48 has been disconnected, the device 10 can be inserted into the optical transmission path 22 by connecting the first connector port 44 toward the upstream end of the opened link 48 and the second connector port 46 toward the downstream end of the opened link 48. In this way, the optical transmission path 22 is made to pass through the device 10.

It is to be noted that while the optical fiber link 48 is disconnected prior to connecting the device 10, the second network element 26 will normally cease sending upstream data to the first network element 24. Upstream data transmission will resume once the device 10 has been connected to the optical transmission path and the second network element 26 has started receiving again downstream data from the first network element 24, at which point measurement can be performed. It is also to be noted that the temporary disruption in the line upon insertion of the device 10 is generally not an issue, given that the device 10 will often be used in diagnosis or troubleshooting applications, where a problem with the line may have already been reported, or under controlled verification conditions.

In some implementations, data communication between the first and the second network elements 24, 26 may be interrupted after a certain period of time for the purpose of saving energy. In this state, the second network element 26 may disable its transmission circuits while continuing to listen to the first network element 24, such that no upstream signal reaches the upstream wavelength analyzer 14. Getting communication to resume can involve momentarily interrupting the connection between the first and the second network elements 24, 26. Such an interruption occurs whenever the device 10 is inserted in the optical transmission path 22 between the first and the second network elements 24, 26. However, if communication is interrupted when the device 10 is already connected, disconnecting and reconnecting the instrument will force restart of the communication. In some implementations, in order to prevent early wear out of the first and second connector ports 44, 46 due to the device 10 being disconnected and reconnected too frequently, a shutter 112 can optionally be provided inside the device 10. The shutter 112 can act as an automatic switch, configured to break and then, immediately or shortly thereafter, re-establish the continuity of the optical transmission path 22 without the user having to physically disconnect the device 10. By way of example, the shutter may be activated by the user via a control interface of the device 10. The shutter 112 in FIG. 2 is provided in the path between first connector port 44 and the optical power splitter assembly 12. However, in other implementations, the shutter 112 could be provided at another point along the optical transmission path 22 inside the device, for example between the optical power splitter assembly 12 and the second connector port 46.

Referring still to FIG. 2, the optical power splitter assembly 12 is serially connected between the first connector port 44 and the second connector port 46. The optical power splitter assembly 12 is a power-dividing element configured to split the downstream light 30 and the upstream light 32 into, on the one hand, respective extracted portions 50, 52 that branch off from the optical transmission path 22, and, on the other hand, non-extracted portions 54, 56 that remain on the optical transmission path 22 and flow out of the device 10. In the embodiment of FIG. 2, the optical power splitter assembly 12 is embodied by a 2×2 fiber-based bidirectional tap, but other types of optical splitters and couplers can be used in other embodiments.

The optical power splitter assembly 12 can include first and second ports 58a, 58b for respectively carrying the non-extracted portions 54, 56 of the downstream light 30 and the upstream light 32 out of the optical power splitter assembly 12 and through the device 10. The optical power splitter assembly 12 can also include a third port 58c for outputting the extracted portion 50 of the downstream light 30, and a fourth port 58d for outputting the extracted portion 52 of the upstream light 32. It is to be noted that, for simplicity, the extracted portion of the downstream light and the extracted portion of the upstream light may in some instances be referred to as the "extracted downstream light" and the "extracted upstream light", respectively.

In some embodiments, the optical power splitter assembly can provide an 80:20 splitting ratio. This means that the optical power splitter assembly 12 extracts 20% of the downstream light 30 and 20% of the upstream light 32 from the optical transmission path 22, with the remaining 80% flowing out of the device 10. Of course, other splitting ratios may be used in other embodiments, for example a 90:10 splitting ratio. Generally, a higher percentage of signal extraction improves power measurement sensitivity, but leads to higher insertion loss for the "pass-through" signals, which, for certain network designs, might result in a non-desirable reduction of system margin.

In the embodiment of FIG. 2, the upstream wavelength analyzer 14 is configured to receive the extracted portion 52 of the upstream light 32 from the optical power splitter assembly 12, and to determine therefrom an upstream spectral characteristic of the upstream light 32. The upstream spectral characteristic can be representative of a central wavelength of the upstream light 32.

Throughout the present description, the term "upstream wavelength analyzer" is intended to refer broadly to any element or combination of elements capable of receiving, manipulating (e.g., splitting and spectrally filtering) and detecting the extracted portion of the upstream light for the purpose of determining the upstream spectral characteristic. As described in greater detail below, the upstream wavelength analyzer may be configured to monitor simultaneously a presence of the upstream light in each of a plurality of distinct upstream spectral bands (e.g., a wavelength band or a frequency band) and, upon detection of the presence of the extracted portion of the upstream light in one of the upstream spectral bands, to generate a detection signal indicative of the upstream spectral characteristic.

In some implementations, the detection signal indicative of the upstream spectral characteristic can be a signal indicative of a presence of the extracted upstream light in one of the upstream spectral bands (or in a portion thereof). By way of example, the detection signal may be a binary indication of a certain magnitude corresponding to a detected threshold value, or a quantified value or measurement (e.g., a measured optical power parameter). In other implementations, the detection signal indicative of the upstream spectral characteristic can be a measured value corresponding to a wavelength (or, equivalently, a frequency) associated with the upstream light, for example a measured value of a central wavelength (or, equivalently, a central frequency) of the upstream light. It is to be noted that, in many cases of interest, the upstream light originating from the first network element does indeed have a relatively simple spectrum, composed of either of a single peak at a certain spectral position, or a single band in a certain spectral range.

In the embodiment of FIG. 2, the processing unit 16 is coupled to the upstream wavelength analyzer 14. The processing unit 16 is configured to identify, based on the upstream spectral characteristic determined by the upstream wavelength analyzer 14, an associated downstream spectral characteristic of a downstream signal of interest 38 among the plurality of downstream signals 38, 40 making up the downstream light 30. The downstream spectral characteristic can be representative of a central wavelength of the downstream signal of interest 38. By way of example, in some implementations, the downstream spectral characteristic can be a spectral range (e.g., a wavelength or frequency range) in which the downstream signal of interest 38 is expected to lie. Alternatively, in other implementations, the downstream spectral characteristic can be an expected value of a wavelength (or, equivalently, a frequency) of the downstream signal of interest, for example a nominal value of its central wavelength or, equivalently, its central frequency).

As used herein, the term "processing unit" refers to an entity of the device that controls and executes, at least partially, the functions required to determine the downstream spectral characteristic associated with the upstream spectral characteristic of the upstream light determined by the upstream wavelength analyzer. The processing unit may be implemented as a single unit or as a plurality of interconnected processing sub-units. The processing unit may be embodied by a microprocessor, a microcontroller, a central processing unit (CPU), a programmable logic device such as, for example, a field-programmable gate array (FPGA), or any other type of processing resource or any combination of such processing resources configured to operate collectively as a processing unit. The processing unit can be implemented in hardware, software, firmware, or any combination thereof, and be connected to various components of the device via appropriate communication ports.

Referring still to FIG. 2, the identification made by the processing unit 16 is based on the principle that the upstream spectral characteristic (e.g., a wavelength value or wavelength range of the upstream light) determined by the upstream wavelength analyzer 14 can be used to yield information about the downstream spectral characteristic (e.g., a corresponding wavelength value or wavelength range of the downstream signal of interest). As mentioned above, the downstream signal of interest is, among the plurality of downstream signals forming the downstream light, the downstream signal which is generated by the first network element (e.g., an OLT in FIG. 2) and listened to by the second network element (e.g., an ONT in FIG. 2). The information about the spectral characteristic of the upstream light may also provide knowledge about the operation mode of the ONT being tested (e.g., NG-PONG2, XG-PON or ABG-PON).

In some implementations, the processing unit 16 can be configured to determine the downstream spectral characteristic associated with the upstream spectral characteristic from reference data relating a set of possible upstream spectral characteristics to a set of possible downstream spectral characteristics, for example a set of possible central wavelength values for the upstream light to a set of possible central wavelength values for the downstream signal of interest. The reference data can represent preset network-dependent configuration data and standards and be embodied by a lookup table stored in a memory element accessible to processing unit 16. By way of example, and as described in greater detail below, the processing unit 16 can use stored information about PON standards to determine that if the central wavelength of the upstream light is between 1290 nm and 1330 nm, then the second network element should be an ABG-PON device and the central wavelength of the downstream signal of interest should be found between 1575 nm and 1580 nm.

In the embodiment of FIG. 2, the downstream filter assembly 18 is configured to receive and filter the extracted portion 50 of the downstream light 30 from the optical power splitter assembly 12. The purpose of filtering the extracted downstream light 50 is to select therefrom the extracted portion 60 of the downstream signal of interest 38 according to the determined downstream spectral characteristic.

In some implementations, the downstream filter assembly 18 can include a number of spectrally selective elements (e.g., optical splitters and filters) configured to isolate the extracted portion 60 of the downstream signal of interest 38 from the extracted downstream light 50. By way of example, the downstream filter assembly 18 can be configured to spectrally split the extracted downstream light 50 into a plurality of downstream spectral bands, one of which contains the extracted portion 60 of the downstream signal of interest 38. As mentioned above, in some implementations, the processing unit 16 is configured to determine the downstream spectral characteristic as a value of the central wavelength of the downstream signal of interest 38. In such a case, the downstream filter assembly 18 can include a tunable passband central wavelength which the processing unit 16 is configured to tune (directly or indirectly, e.g., via a controller associated with the downstream filter assembly) to the determined value of the central wavelength of the downstream signal of interest 38, thereby selecting the portion 60 of the downstream signal of interest 38.

Referring still to FIG. 2, the downstream optical power meter assembly 20 is configured to measure an optical power parameter of the portion 60 of the downstream signal of interest 38 selected by the downstream filter assembly 18. As used herein, the term "optical power parameter" is intended to encompass different parameters representative of the optical power of the downstream signal of interest, including a peak optical power, an average optical power measured over a given time duration, and the like. In some implementations, the downstream optical power meter assembly 20 can include one or a plurality of power meter devices. The or each power meter device can be configured to measure an optical power parameter of a respective filtered signal outputted by the downstream filter assembly 18 in a corresponding downstream spectral band. The or one of the optical power parameters measured by the downstream optical power meter assembly 20 corresponds to the optical power parameter of the portion 60 of the downstream signal of interest 38, which is relevant to the optical power measurement procedure performed by the device 10. In some implementations where more than one optical power parameters are measured by the downstream optical power meter assembly 20, the processing unit 16 can be configured to identify, based on the determined downstream spectral characteristic, which of these optical power parameters is the "relevant" one corresponding to the optical power parameter of the portion 60 of the downstream signal of interest 38.

PON upstream and downstream signals typically consist of data bursts alternating with lulls. As known in the art, if the downstream signal of interest 38 includes a bursty digital signal, the downstream optical power meter assembly 20 may be configured to extract the optical power of the bursts averaged over the duration of the burst, by extracting the power only from the data bursts and not from any intervening series of digital zeros (i.e. lack of signal).

In some implementations, the results of the testing by the device 10 may be displayed to the operator on a display 98 provided on the housing 42. By way of example, the display 98 can be embodied by a liquid crystal display (LCD) screen. However, any other appropriate display technology such as, for example, LED technology, organic LED (OLED) technology, or active-matrix OLED (AMOLED) technology could be used in other embodiments. By way of example, the information presented on the display can include, without being limited to: the type of PON being tested (e.g., ABG-PON, XG-PON, NG-PON2, etc.), the downstream and/or upstream transmission rates, the downstream and/or upstream wavelengths or wavelength channels, the optical power of the downstream and/or upstream signals, and a pass/fail indicator.

More details regarding various other structural and operational features of the device and method will now be given below, with reference to the exemplary embodiments of FIGS. 3 to 5.

Second Embodiment of a Device for Optical Power Measurement

Figure 3:
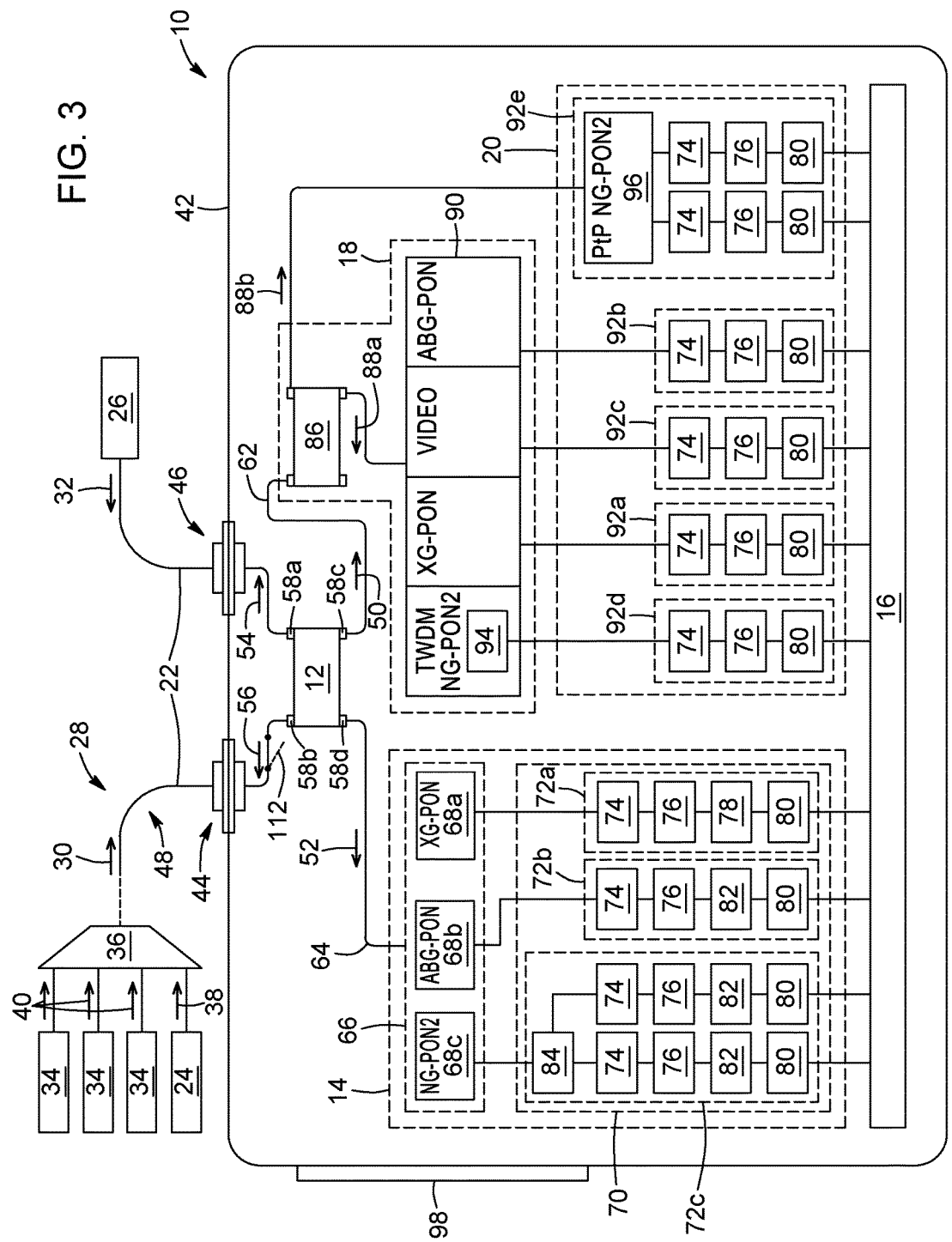
FIG. 3 is a schematic block diagram of a device for optical power measurement in a multiple-wavelength PON system shown along with elements of the PON system, in accordance with a second exemplary embodiment.

Referring now to FIG. 3, there is illustrated a second exemplary embodiment of a device 10 operable as a PON power meter. The device 10 is suitable for optical power measurement along an optical transmission path 22 extending between a first network element 24 and a second network element 26 in a multiple-wavelength PON 28 implementing NG-PON2 with coexistence of ABG-PON, XG-PON and RF video overlay on the same ODN. In the illustrated embodiment, the first network element 24 is embodied by an OLT and the second network element 26 is embodied by an ONT. The optical transmission path 22 supports concurrent, bidirectional propagation of downstream light 30 and upstream light 32. The downstream light 30 includes a plurality of downstream signals 38, 40 having mutually different central wavelengths, one of which corresponding to the downstream signal of interest 38, that is, the downstream signal read by the second network element 26. The device 10 aims to measure the optical power of the downstream signal of interest 38.

Many features of this second embodiment of the device 10 can be generally similar to like features described for the first embodiment. Accordingly, the second embodiment of the device 10 generally includes an optical power splitter assembly 12, an upstream wavelength analyzer 14, a processing unit 16, a downstream filter assembly 18, and a downstream optical power meter assembly 20.

The optical power splitter assembly 12 in FIG. 3 is serially connected between the first connector port 44 and the second connector port 46, and is configured to extract, from the optical transmission path 22, a portion 50 of the downstream light 30 and a portion 52 of the upstream light 32. As for the embodiment of FIG. 2, the optical power splitter assembly 12 in FIG. 3 is embodied by a 2×2 bidirectional tap with an 80:20 splitting ratio, but other optical splitter types and splitting ratio values can be used in other embodiments. The optical power splitter assembly 12 includes four ports 58a to 58d. The first and the second ports 58a, 58b are used to output the non-extracted downstream light 54 and the non-extracted upstream light 56 that flow through the device, respectively. Meanwhile, the third and the fourth ports 58c, 58d are used to output the extracted downstream light 50 and the extracted upstream light 52 along respective downstream and upstream paths 62, 64.

The upstream wavelength analyzer 14 is positioned in the upstream path 64 and configured to receive the extracted upstream light 52 and determine therefrom an upstream spectral characteristic representative of a central wavelength of the upstream light 32.

In the NG-PON2 standard, but also in legacy PON standards, the upstream light originating from a given ONT generally includes a single upstream wavelength channel characterized by a single central wavelength. Measuring the value of the central wavelength of the upstream light or determining its presence in a certain upstream spectral band can provide knowledge about the downstream spectral characteristic, for example the value of the central wavelength of the downstream signal of interest or its presence in a corresponding downstream spectral band, as well as about the PON standard used by the second network element.

In the embodiment of FIG. 3, the upstream wavelength analyzer 14 includes an upstream filter assembly 66 configured to filter the extracted upstream light 52 and including a plurality of optical filters 68a to 68c, each of which having a passband corresponding to one of a plurality of distinct upstream spectral bands. In some implementations, the upstream filter assembly 66 can be embodied by a demultiplexing assembly configured to demultiplex the extracted upstream light 52 into the plurality of upstream spectral bands. By way of example, the demultiplexing assembly may include two cascaded wavelength demultiplexers based, for instance, on wavelength-dependent fused couplers or bulk filters. Of course, other embodiments may use different configurations for the upstream filter assembly 66.

In the illustrated embodiment, the upstream wavelength analyzer 14 also includes an upstream detection assembly 70 configured to detect the filtered output from the upstream filter assembly 66. The upstream detection assembly 70 includes a plurality of upstream detection circuits 72a to 72c respectively associated with the plurality of optical filters 68a to 68c. Each upstream detection circuit 72a to 72c is configured to receive a filtered signal from the associated optical filter 68a to 68c and to generate, upon detection of the presence of the upstream light 32 in the one of the upstream spectral bands, a detection signal indicative of the upstream spectral characteristic.

The upstream detection assembly 70 is coupled to the processing unit 16. The processing unit 16 is configured to receive the detection signal indicative of the upstream spectral characteristic and to determine therefrom a downstream spectral characteristic of the downstream signal of interest among the plurality of downstream signals forming the downstream light 30. As mentioned above, the processing unit 16 can determine the downstream spectral characteristic from network configuration data relating a set of possible upstream spectral characteristics to a set of possible downstream spectral characteristics.

In the exemplary embodiment of FIG. 3, the upstream filter assembly 66 includes three bandpass optical filters 68a to 68c respectively associated to the three upstream detection circuits 72a to 72c of the upstream detection assembly 70. The three optical filters 68a to 68c are configured to allow passage of light in three respective upstream spectral bands, including a first upstream spectral band ranging from 1260 nm to 1280 nm, a second upstream spectral band ranging from 1290 nm to 1330 nm, and a third upstream spectral band ranging from 1524 nm to 1625 nm. Of course, the number and the passband spectral ranges of the bandpass optical filters 68a to 68c illustrated in FIG. 3 are provided by way of example only and may be varied in other embodiments.

More specifically, the first optical filter 68a is configured to select wavelengths in the first upstream spectral band, which ranges from 1260 nm to 1280 nm (i.e., 1260 nm<λ<1280 nm). Accordingly, the extracted upstream light 52 in the first upstream spectral band passes through the first optical filter 68a and reaches the first upstream detection circuit 72a, which detects its presence and measures its optical power. The presence of light in the first upstream spectral band signifies that the second network element 26 is an XG-PON device. In such a case, the processing unit 16 draws a conclusion that the downstream signal of interest is to be found in a downstream spectral band ranging from 1575 nm to 1580 nm.

By way of example, in the embodiment of FIG. 3, the first upstream detection circuit 72a includes an optical-to-electrical (O/E) converter 74 (e.g., an InGaAs detector) for generating an electronic signal representative of the detected light, a transimpedance amplifier 76 for amplifying the electronic signal, a peak detector 78 for detecting a peak value in the amplified electronic signal, and an analog-to-digital (A/D) converter (ADC) 80 for converting the output of the peak detector 78 into digital output data. The digital output data is processed to yield a value that determines the optical power of the extracted upstream light 52 in the first upstream spectral band.

Referring still to FIG. 3, the second optical filter 68b is configured to select wavelengths in the second upstream spectral band, which ranges from 1290 nm to 1330 nm (i.e., 1290 nm<λ<1330 nm). Accordingly, the extracted upstream light 52 in the second upstream spectral band passes through the second optical filter 68b and reaches the second upstream detection circuit 72b. The second upstream detection circuit 72b detects the presence of light outputted by the second optical filter 68b and measures its optical power as well as the duration of its keep-alive burst response.

The presence of light (i.e., typically several wavelengths) in the second upstream spectral band is an indication that the second network element 26 is an ABG-PON device. In such a case, the processing unit 16 concludes that a data downstream signal of interest is to be found in a downstream spectral band ranging from 1480 nm to 1500 nm. The processing unit also concludes that a video downstream signal of interest may possibly be found in a downstream spectral band ranging from 1550 nm to 1560 nm, and that an extra data downstream signal of interest may possibly be found in a downstream spectral band ranging from 1539 nm to 1565 nm (not shown in FIG. 3). The processing unit 16 may also determine the upstream transmission bitrate from the keep-alive burst response duration, for example based on reference data (e.g., a lookup table).

By way of example, in the embodiment of FIG. 3, the second upstream detection circuit 72b includes an O/E converter 74 (e.g., an InGaAs detector) for generating an electronic signal representative of the detected light, and a transimpedance amplifier 76 for amplifying the electronic signal. The amplified electronic signal is directed to a peak-and-duration detector 82, where it is split in two parts. The first part is directed to a peak detector. The second part is directed to a filter having a time constant longer than the longest upstream burst to be detected by the device 10, and then to a peak detector to retrieve the average power of the upstream burst over the time corresponding to the longest burst duration possibly supported by the device 10. An ADC 80 converts the output of the peak-and-duration detector 82 into digital output data. The digital output data is processed to yield two power values. The first power value determines the optical power of the extracted upstream light 52 in the second upstream spectral band, while the ratio of first power value to the second filtered power value determines the upstream burst duration and, in turn, the upstream signal bitrate.

The third optical filter 68c is configured to select wavelengths in the third upstream spectral band, which ranges from 1524 nm to 1625 nm (i.e., 1524 nm<λ<1625 nm). Accordingly, the extracted upstream light 52 in the third upstream spectral band passes through the third optical filter 68c and reaches the third upstream detection circuit 72c. The third upstream detection circuit 72c detects the presence of light outputted by the third optical filter 68c and measures its optical power, its central wavelength, and the duration of its keep-alive burst response.

The presence of light (i.e., a single wavelength) in the third upstream spectral band is an indication that the second network element 26 is a NG-PON2 device implementing either a TWDM or a PtP operation mode. In such a case, the processing unit 16 is configured to determine the expected value of the central wavelength of the downstream signal of interest from the measured value of the central wavelength of the upstream light 32 based on reference data (e.g., a lookup table) relating a set of possible central wavelength values for the upstream light to a set of possible central wavelength values for the downstream signal of interest. The processing unit 16 may also determine the upstream transmission bitrate from the keep-alive burst response. It is to be noted that since only one upstream wavelength channel is expected to be present in the third upstream spectral range, a single-wavelength meter could be used in some implementations, which can reduce the cost of the device. It is also to be noted that, in some implementations, the value of the measured upstream central wavelength may further be used to calibrate the device 10.

Referring still to FIG. 3, the third upstream detection circuit 72c is configured to measure the central wavelength and the optical power of the upstream light 32. The third upstream detection circuit 72c includes a bandpass splitting filter 84 that splits and filters incoming light from the upstream filter assembly 66 into a first signal (signal A) and a second signal (signal B) with a known or precalibrated wavelength-dependent splitting ratio in a passband ranging from 1524 nm to 1625 nm. The bandpass splitting filter 84 may be embodied by a slope filter with the desired or required passband.

The third upstream detection circuit 72c also includes O/E converters 74 (e.g., InGaAs detectors) for generating electronic signals representative of signals A and B, and transimpedance amplifiers 76 for amplifying the two electronic signals. Each amplified electronic signal is sent to a respective peak-and-duration detector 82, where it is split in two parts. Each first part is directed to a peak detector (P1A, P1B). Each second part is directed to a filter having a time constant longer than the longest upstream burst to be detected by the device 10, and then to a peak detector (P2A, P2B). An ADC 80 then converts the output of the two peak-and-duration detectors 82 into digital output data.

The digital output data is processed to yield four power values. The sum of the power values corresponding to the two first parts (P1A+P1B) determines the optical power of the extracted upstream light 52 in the third upstream spectral band, and the ratio of the power values corresponding to the two second parts (P2A/P2B) is used to determine the central wavelength of the extracted upstream light 52 (and thus of the upstream light 32 itself), for example using a prerecorded calibration table. Also, the ratio of the sum of the power values corresponding to the two first parts to the sum of the power values corresponding to the two second parts [i.e., (P1A+P1B)/(P2A+P2B)] can be used to determine the upstream burst duration and, in turn, the upstream signal bitrate.

It is to be noted that the configurations for the plurality of upstream detection circuits 72a to 72c depicted in FIG. 3 are provided by way of example only, and may be varied in other implementations. For example, in some implementations, the first upstream detection circuit 72a may include a peak-and-duration detector instead of only a peak detector, whereas each of the second and third upstream detection circuits 72b, 72c may include only a peak detector instead of a peak-and-duration detector.

Referring still to FIG. 3, the downstream filter assembly 18 is positioned in the downstream path 62 and configured to receive and filter the extracted portion 50 of the downstream light 30 to select therefrom a portion of the downstream signal of interest according to the determined downstream spectral characteristic.

In the illustrated embodiment, the downstream filter assembly 18 is capable of analyzing two downstream wavelength mappings, namely a first wavelength mapping for TWDM NG-PON2, ABG-PON, XG-PON and RF video overlay, and a second wavelength mapping for PtP NG-PON2. Two wavelength mappings, each leading to its own detection path in the downstream optical power meter assembly 20 (see below), are provided in FIG. 3 to account for the fact that the expanded downstream spectrum for PtP NG-PON2 overlaps the downstream spectral bands of XG-PON and RF video overlay. For this purpose, the downstream filter assembly 18 includes a downstream optical power splitter assembly 86 configured to receive the extracted downstream light 50 from the optical power splitting assembly 12. The downstream optical power splitter assembly 86 is a power-dividing coupling element configured to split the extracted downstream light 50 into a first portion 88a and a second portion 88b. In the embodiment of FIG. 3, downstream optical power splitter assembly 86 has a 50:50 splitting ratio, but other splitting ratio values can be used in other embodiments (e.g., 40:60). The first extracted downstream light portion 88a is used to detect TWDM NG-PON2, ABG-PON, XG-PON and RF video overlay downstream signals, whereas the second extracted downstream light portion 88b is used to detect PtP NG-PON2 downstream signals.

In FIG. 3, the downstream filter assembly 18 includes a downstream demultiplexing assembly 90 that receives the first extracted downstream light portion 88a from the downstream optical power splitter assembly 86. The downstream demultiplexing assembly 90 is configured to spectrally split the first extracted downstream light portion 88*a* into a plurality of downstream spectral bands, namely four downstream spectral bands in the illustrated embodiment. More particularly, the four downstream spectral bands include:

- a first downstream spectral band ranging from 1575 nm to 1580 nm, which corresponds to XG-PON downstream signals associated with upstream signals in the first upstream spectral band (1260 nm to 1280 nm);
- a second downstream spectral band ranging from 1480 nm to 1500 nm, which corresponds to ABG-PON downstream signals associated with upstream signals in the second upstream spectral band (1290 nm to 1330 nm);
- a third downstream spectral band ranging from 1550 nm to 1560 nm, which corresponds to downstream video signals associated with upstream signals also in the second upstream spectral band (1290 nm to 1330 nm); and
- a fourth downstream spectral band ranging from 1596 nm to 1603 nm, which corresponds to TWDM NG-PON2 downstream signals associated with upstream signals in the third upstream spectral band (1524 nm to 1544 nm).

By way of example, the downstream filter assembly 18 may include three cascaded wavelength demultiplexers based, for instance, on wavelength-dependent fused couplers or bulk filters. Of course, other embodiments may use different configurations for the downstream filter assembly 18.

As mentioned above, when the second network element 26 is a NG-PON2 device, the processing unit 16 is configured to determine not only the downstream spectral band in which to find the downstream signal of interest, but also a central wavelength value of the downstream signal of interest. The processing unit 16 can determine the expected value of the central wavelength of the downstream signal of interest from the measured value of the central wavelength of the upstream light (as measured by the third upstream detection circuit 72*c* in FIG. 3) by consulting reference data (e.g., a prerecorded lookup table) relating a set of possible central wavelength values for the upstream light to a set of possible central wavelength values for the downstream signal of interest.

In the case of a TWDM NG-PON2 mode of operation, several downstream signals in different WDM downstream wavelength channels reach the second network element 26, although only one downstream signal is actually read. To account for this mode of operation, the downstream filter assembly 18 can be provided with a tunable bandpass optical filter 94 configured to receive filtered light from the downstream demultiplexing assembly 90 in the fourth downstream spectral band (1596 nm to 1603 nm; TWDM NG-PON2 transmission). The tunable bandpass optical filter 94 has a passband central wavelength that can be adjusted to the value of the central wavelength of the downstream signal of interest determined by the processing unit 16. It will be understood that the provision of the tunable bandpass optical filter 94 enables the selection of the relevant downstream wavelength channel in the fourth downstream spectral band, and the subsequent measure of its optical power (see below). In particular, the passband central wavelength of the filter 94 can be automatically adjusted directly or indirectly by the processing unit 16 as a function of the measured central wavelength value of the upstream light 32.

Meanwhile, the second extracted downstream light portion 88*b* is sent directly to the downstream optical power meter assembly 20.

In the illustrated embodiment, the downstream optical power meter assembly 20 includes a plurality of power meter devices 92*a* to 92*e*. Each power meter device 92*a* to 92*e* is configured to measure an optical power parameter of a corresponding signal received from the downstream filter assembly 18. However, only one of the optical power parameters measured by the plurality of power meter devices 92*a* to 92*e* corresponds to the "optical power parameter of interest", that is, the optical power parameter associated with the extracted portion of the downstream signal of interest. As mentioned above, the processing unit 16 can determine which of the plurality of power meter devices 92*a* to 92*e* measures the optical power parameter of interest based on the determination of the downstream spectral characteristic (e.g., central wavelength or presence in a certain wavelength range) of the downstream signal of interest from the measured upstream spectral characteristic of the upstream light.

In some implementations, the downstream optical power meter assembly can be configured to measure only one optical power parameter, namely the optical power parameter of the downstream signal of interest as determined by the processing unit. In some of these implementations, the processing unit may be configured to instruct the downstream optical power meter assembly to make optical power measurements only with the power meter device that receives the downstream signal of interest. In other of these implementations, the downstream optical power meter assembly can include a single power meter device and a selector, the selector being configured to select, based on the determination made by the processing unit, the downstream signal of interest among the plurality of downstream signals, and to direct the downstream signal of interest to the single power meter device for measurement of its optical power.

The first, second and third power meter devices 92*a*, 92*b*, 92*c* receive filtered light from the downstream demultiplexing assembly 90 in the first downstream spectral band (1575 nm to 1580 nm; XG-PON transmission), the second downstream spectral band (1480 nm to 1500 nm; ABG-PON), and the third downstream spectral band (1550 nm to 1560 nm; RF video overlay transmission), respectively. Similarly, the fourth power meter device 92*d* receives filtered light outputted by the downstream demultiplexing assembly 90 in the fourth downstream spectral band (1596 nm to 1603 nm; TWDM NG-PON2 transmission) and subsequently filtered further by the tunable bandpass optical filter 94.

In the illustrated embodiment of FIG. 3, each of the first, second, third and fourth power meter devices 92*a* to 92*d* includes an O/E converter 74 (e.g., an InGaAs detector) for generating an electronic signal representative of the detected filtered light from the downstream demultiplexing assembly 90, a transimpedance amplifier 76 for amplifying the electronic signal, and an ADC 80 for converting the amplified electronic signal into digital output data. The digital output data is processed to yield a value that determines the optical power parameter of the extracted downstream light 50 in each of the first, second, third and fourth downstream spectral bands.

The fifth power meter device 92*e* receives the second extracted downstream light portion 88*b* from the downstream optical power splitter 86 in order to detect PtP NG-PON2 downstream signals in the range from 1524 nm to 1625 nm. As known in the art, in the case of a PtP NG-PON2 mode of operation, a single downstream signal at a single wavelength reaches the second network element 26. The fifth power meter device 92e is configured to measure not only the optical power of the second extracted downstream light portion 88b, but also its wavelength. Accordingly, the fifth power meter device 92e can act as both a single-wavelength meter and a power meter.

In the illustrated embodiment, the fifth power meter device 92e in FIG. 3 includes a bandpass splitting filter 96 that splits and filters the second extracted downstream light portion 88b into first and second signals using a known or precalibrated wavelength-dependent splitting ratio in a passband ranging from 1524 nm to 1625 nm. As for the bandpass splitting filter 84 in the third upstream detection circuit 72c, the bandpass splitting filter 96 can be embodied by a slope filter with the desired or required passband.

The fifth power meter device 92e also includes O/E converters 74 (e.g., InGaAs detectors) for generating electronic signals representative of the two split signals, transimpedance amplifiers 76 for amplifying the two electronic signals, and an ADC 80 for converting the amplified electronic signals into digital output data. The digital output data is processed to yield two power values. The sum of these two power values determines the optical power parameter associated with the second extracted downstream light portion 88b, whereas the ratio of these two power values can be used to determine its wavelength, for example using a prerecorded calibration table. The measured wavelength determines the dedicated wavelength channel of the downstream signal. This information may be employed by the device 10 to verify that the downstream channel wavelength matches the measured upstream channel wavelength, thus providing a useful troubleshooting feature. The value of measured downstream wavelength may also be used to determine the proper calibration constant for the device 10.

It is to be noted that, in the illustrated embodiment, the fifth power meter device 92e will generally yield meaningful wavelength and optical power measurements only in the case of a PtP NG-PON2 operation where the downstream light 30 includes a single downstream signal in the range from 1524 nm to 1625 nm.

It is to be noted that the configurations for the plurality of power meter devices 92a to 92e depicted in FIG. 3 are provided by way of example only, and may be varied in other implementations.

Likewise, the number and spectral ranges of the upstream and downstream spectral bands considered in the exemplary embodiment of FIG. 3 are also exemplary only, and may be different in other embodiments. In this regard, it is to be noted that some implementations of the device disclosed herein are intended to be modular in that the number and/or the width of the downstream and upstream spectral bands covered by the device can be modified as required or desired by the particular application so that users are free to use as many or as few as necessary to achieve adequate optical power testing. In particular, depending upon the particular combination of PON standards used in a given customer's network, only part of the configuration exemplified in FIG. 3 may be needed. In such a case, it may be possible to reduce the cost of the device by including only those parts, configurations and functions that are required given a priori knowledge about the hardware and topology of the network.

Third Embodiment of a Device for Optical Power Measurement

Figure 4:
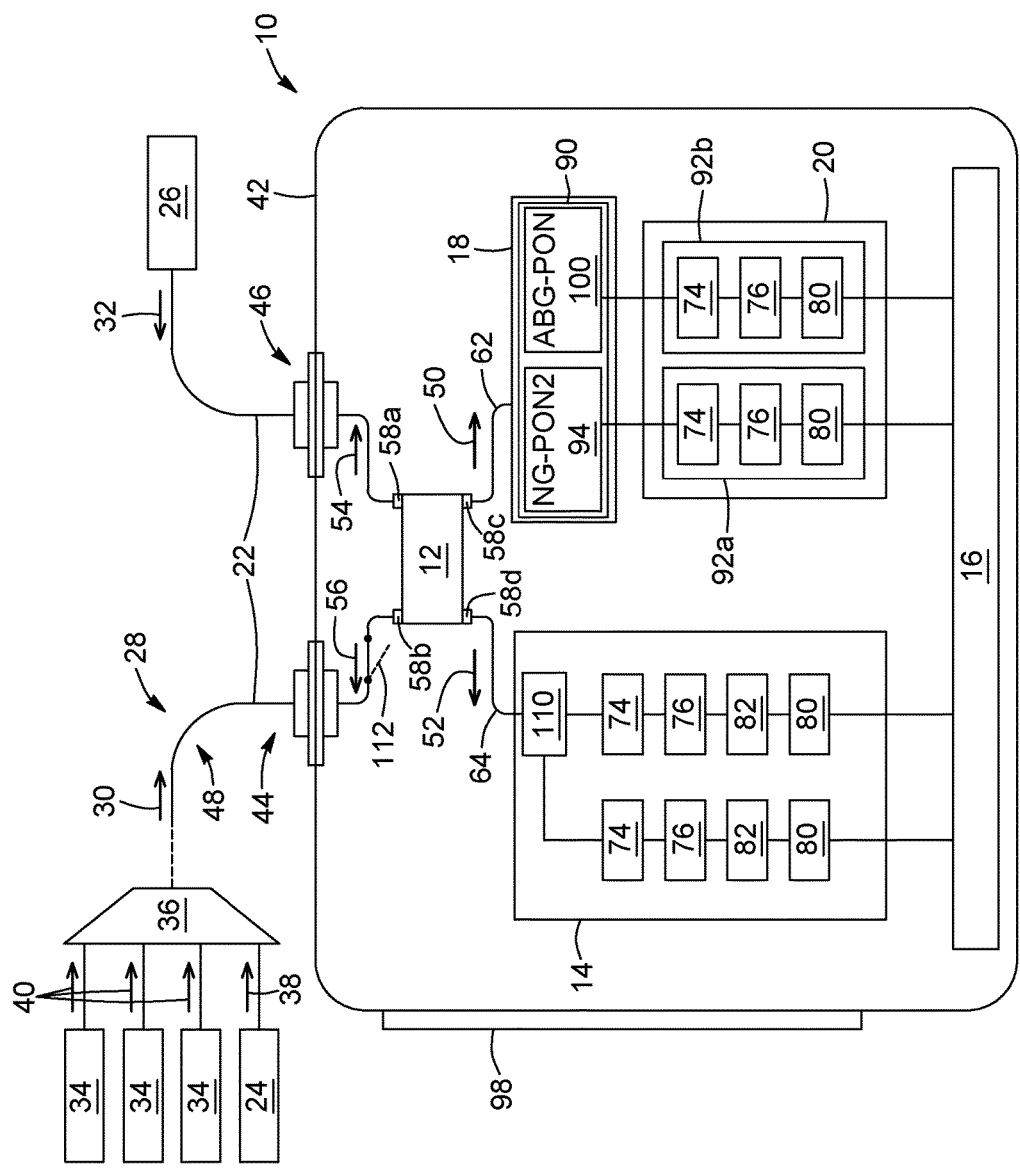
FIG. 4 is a schematic block diagram of a device for optical power measurement in a multiple-wavelength PON system shown along with elements of the PON system, in accordance with a third exemplary embodiment.

Referring now to FIG. 4, there is illustrated a third exemplary embodiment of a device 10 operable as a PON power meter. Many features of this third embodiment can be generally similar to like features described above for the first and second embodiments, and they will not be described again in detail other than to highlight differences. The third embodiment of the device 10 generally includes an optical power splitter assembly 12 configured to extract, from the optical transmission path 22, a portion 50 of the downstream light 30 and a portion 52 of the upstream light 32. The device 10 also includes an upstream wavelength analyzer 14, a processing unit 16, a downstream filter assembly 18, and a downstream optical power meter assembly 20.

The device 10 is suitable for optical power measurement along an optical transmission path 22 extending between a first network element 24 and a second network element 26 in a multiple-wavelength PON 28. However, the PON 28 in FIG. 4 has a different architecture than that in the second embodiment shown in FIG. 3, namely in that it supports coexistence of NG-PON2 with ABG-PON, but not with XG-PON or RF video overlay.

In particular, the configuration of the upstream wavelength analyzer 14, the downstream filter assembly 18 and the downstream optical power meter assembly 20 is simpler in FIG. 4 than in FIG. 3. This is mostly due to the fact that, as opposed to XG-PON and RF video overlay, the ABG-PON downstream band (1480 nm to 1500 nm) does not overlap with the NG-PON2 downstream channels (1524 nm to 1625 nm). This means that when the upstream light 32 is found in the spectral range from 1524 nm to 1625 nm, it is expected to be confined to a single upstream wavelength channel characterized by a single central wavelength. As a result, the configuration of the upstream wavelength analyzer 14 in the embodiment of FIG. 4 can correspond to that of a single-wavelength meter, with optional optical power measuring capabilities.

More particularly, the upstream wavelength analyzer 14 can be similar to the third upstream detection circuit 72 of the embodiment of FIG. 3. Namely, the upstream wavelength analyzer 14 can include a bandpass splitting filter 110 that splits and filters the extracted downstream light 50 from the optical power splitter assembly 12 into a first signal (signal A) and a second signal (signal B) with a known or precalibrated wavelength-dependent splitting ratio in a passband ranging from 1524 nm to 1625 nm, corresponding to the upstream spectral band for NG-PON2. The bandpass splitting filter 110 may be embodied by a slope filter with the desired or required passband. Of course, this configuration is provided by way of example only, and various other configurations of single-wavelength meters can be used to implement the upstream wavelength analyzer 14 depicted in FIG. 4.

The upstream wavelength analyzer 14 can also include O/E converters 74 (e.g., InGaAs detectors) for generating electronic signals representative of signals A and B, and transimpedance amplifiers 76 for amplifying the two electronic signals. Each amplified electronic signal is sent to a respective peak-and-duration detector 82, where it is split in two parts. Each first part is directed to a peak detector (P1A, P1B). Each second part is directed to a filter having a time constant longer than the longest upstream burst to be detected by the device 10, and then to a peak detector (P2A, P2B). An ADC 80 then converts the output of the two peak-and-duration detectors 82 into digital output data.

The digital output data is processed to yield four power values. The sum of the power values corresponding to the two first parts (P1A+P1B) determines the optical power of the extracted upstream light 52, and the ratio of the power values corresponding to two the second parts (P2A/P2B) is used to determine the central wavelength of the extracted upstream light 52 (and thus of the upstream light 32 itself), for example using a prerecorded calibration table. Also, the ratio of the sum of the power values corresponding to the two first parts to the sum of the power values corresponding to the two second parts [i.e., (P1A+P1B)/(P2A+P2B)] can be used to determine the upstream burst duration and, in turn, the upstream signal bitrate.

Once the value of the central wavelength of the upstream light 32 has been determined by the upstream wavelength analyzer 14, the processing unit 16 can be used to determine the central wavelength of the downstream signal of interest, for example by consulting NG-PON2 reference data relating a set of possible central wavelength values for the upstream light to a set of possible central wavelength values for the downstream signal of interest. It will be understood that since the PON 28 in FIG. 4 supports only NG-PON2 and ABG-PON, it is not necessary for the upstream wavelength analyzer 14 to be configured for wavelength measurements in the ABG-PON upstream band. Indeed, the processing unit 16 will conclude that the upstream light 32 is an ABG-PON signal whenever the upstream wavelength analyzer 14 does not detect a signal in the NG-PON2 upstream band (i.e., from 1524 nm to 1625 nm).

Referring still to FIG. 4, the downstream filter assembly 18 receives and spectrally filters the extracted downstream light 50 to select therefrom a portion of the downstream signal of interest according to the determined downstream spectral characteristic. The downstream filter assembly 18 can include a downstream demultiplexing assembly 90 configured to spectrally split the extracted downstream light 50 into two of downstream spectral bands, namely a first downstream spectral band ranging from 1524 nm to 1625 nm and corresponding to NG-PON2 downstream signals (both TWDM and PtP), and a second downstream spectral band ranging from 1480 nm, or less, to 1500 nm and corresponding to ABG-PON downstream signals.

More particularly, the downstream demultiplexing assembly 90 can include a tunable bandpass optical filter 94 configured to receive the extracted downstream light 50. The tunable bandpass optical filter 94 can have a passband central wavelength tunable to the value of the central wavelength of the downstream signal of interest determined by the processing unit 16 from the value of the upstream central wavelength measured by the upstream wavelength analyzer 14. In the illustrated embodiment, the passband central wavelength of the bandpass optical filter 94 is tunable in a wavelength range extending from 1524 nm to 1625 nm in order to encompass NG-PON2 signals. In some implementations, the passband central wavelength of the filter 94 can be automatically adjusted directly or indirectly by the processing unit 16 as a function of the measured central wavelength value of the upstream light 32. The downstream demultiplexing assembly 90 can also include a second bandpass filter 100 filtering light rejected by the tunable bandpass optical filter 94 in the second downstream spectral band (i.e., from 1480 nm to 1500 nm) to select ABG-PON downstream signals.

Referring still to FIG. 4, the downstream optical power meter assembly 20 includes a first power meter device 92a configured to measure an optical power parameter of the filtered output signal from the tunable bandpass filter 94, and a second power meter device 92b configured to measure an optical power parameter of the filtered output signal from the second bandpass filter 100. Each of the first and second power meter devices 92a, 92b can have a configuration similar to that of the power meter devices 92a to 92e described above with reference to FIG. 3, or another appropriate configuration.

As mentioned above, only one of two optical power parameters measured by the first and the second power meter devices 92a, 92b corresponds to the optical power parameter of interest, which can be determined by the processing unit 16. Namely, the processing unit 16 will determine that the optical power parameter of interest corresponds to that measured by the first power meter device 92a if the upstream wavelength analyzer detects the presence of the upstream light 32 between 1524 nm and 1625 nm, and to that measured by the second power meter device 92b if the upstream wavelength analyzer does not detect the presence of the upstream light 32 between 1524 nm and 1625 nm.

Fourth Embodiment of a Device for Optical Power Measurement

Figure 5:
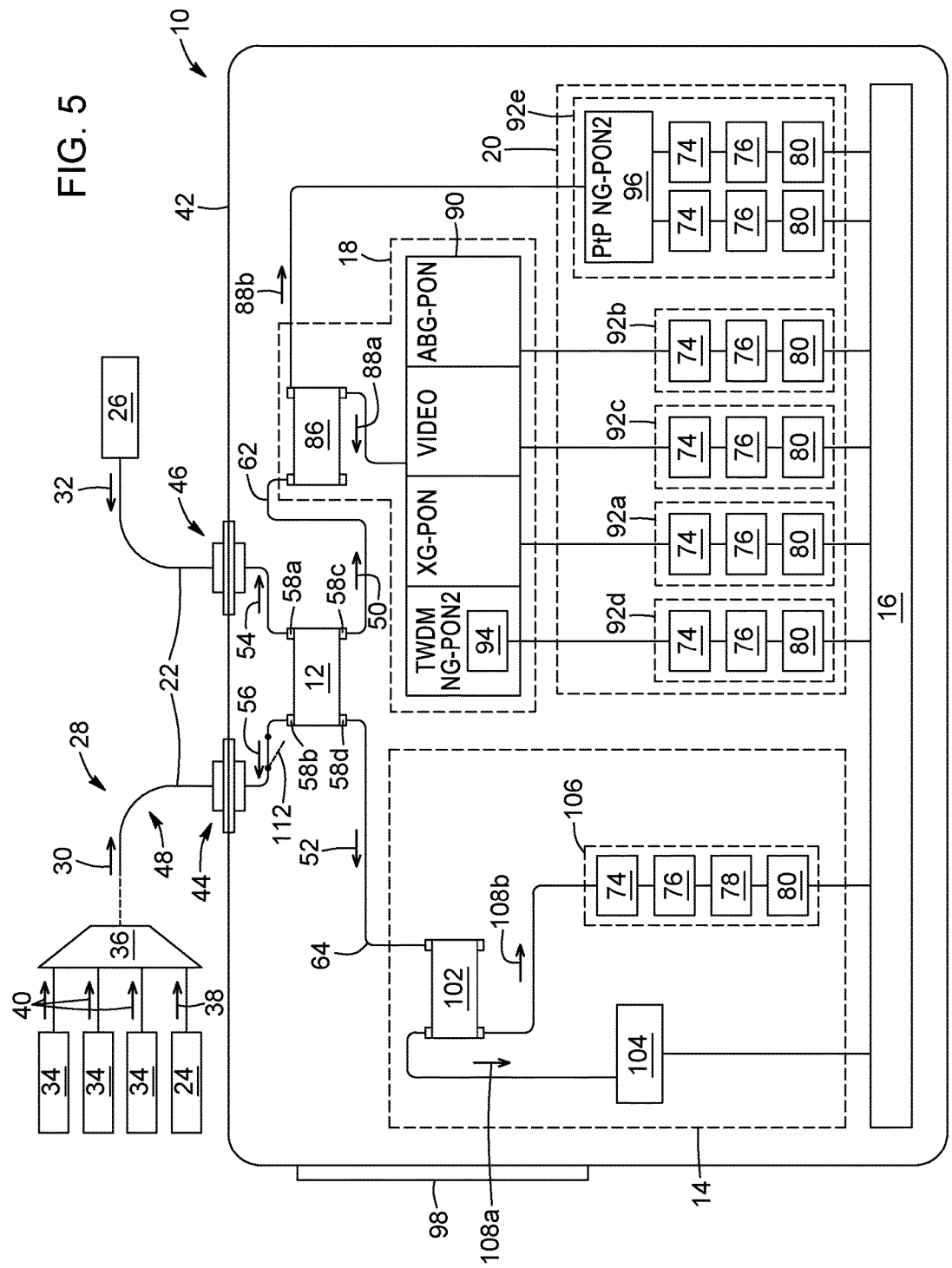
FIG. 5 is a schematic block diagram of a device for optical power measurement in a multiple-wavelength PON system shown along with elements of the PON system, in accordance with a fourth exemplary embodiment.

Referring now to FIG. 5, there is illustrated a fourth exemplary embodiment of a device 10 operable as a PON power meter. Again, many features of this fourth embodiment can be generally similar to like features described above for the second embodiment with reference to FIG. 3. Accordingly, the fourth embodiment of the device 10 generally includes an optical power splitter assembly 12, an upstream wavelength analyzer 14, a processing unit 16, a downstream filter assembly 18, and a downstream optical power meter assembly 20. However, the fourth embodiment of the device 10 differs from the second embodiment mainly in the configuration of the upstream wavelength analyzer 14. More particularly the upstream wavelength analyzer 14 in FIG. 5 is configured such that the measurement of the upstream spectral characteristic (e.g., the wavelength or wavelength range) of the upstream light 32 is decoupled from the measurement of its optical power. To this end, the upstream wavelength analyzer 14 includes an upstream optical power splitter assembly 102, an upstream wavelength meter 104, and an upstream power meter 106.

The upstream optical power splitter assembly 102 is configured to receive the extracted upstream light 52 from the optical power splitting assembly 12, and to split it into respective first and second portions 108a, 108b. In the illustrated embodiment, the upstream optical power splitter assembly 102 has a 20:80 splitting ratio, but other splitting ratio values can be used in other embodiments. The first portion 108a (20%) is sent to the upstream wavelength meter 104, which is configured to determine the upstream spectral characteristic (e.g., a wavelength value or range) corresponding to the upstream light 32. Meanwhile, the second portion 108b (80%) is sent to the upstream power meter 106, where its optical power is measured. The upstream power meter 106 can have a configuration similar to that of the first and second upstream detection circuits 72a, 72b described above with reference to FIG. 3, or another appropriate configuration.

The processing unit 16 will use the wavelength information outputted by the upstream wavelength meter 104 to determine the downstream spectral characteristic (e.g., a wavelength value or range) corresponding to the downstream spectral of interest. The processing unit 16 will also identify, based on the determined downstream spectral characteristic, the optical power parameter measured by the downstream optical power meter assembly 20 corresponding to the optical power parameter of the portion of the downstream signal of interest. Furthermore, when the upstream light 32 corresponds to a NG-PON2 upstream signal, the processing unit 16 can be configured to tune a tunable passband central wavelength of the downstream filter assembly 18 to the determined value of the wavelength of the downstream signal of interest.

Fifth Embodiment of a Device for Optical Power Measurement

Figure 6:
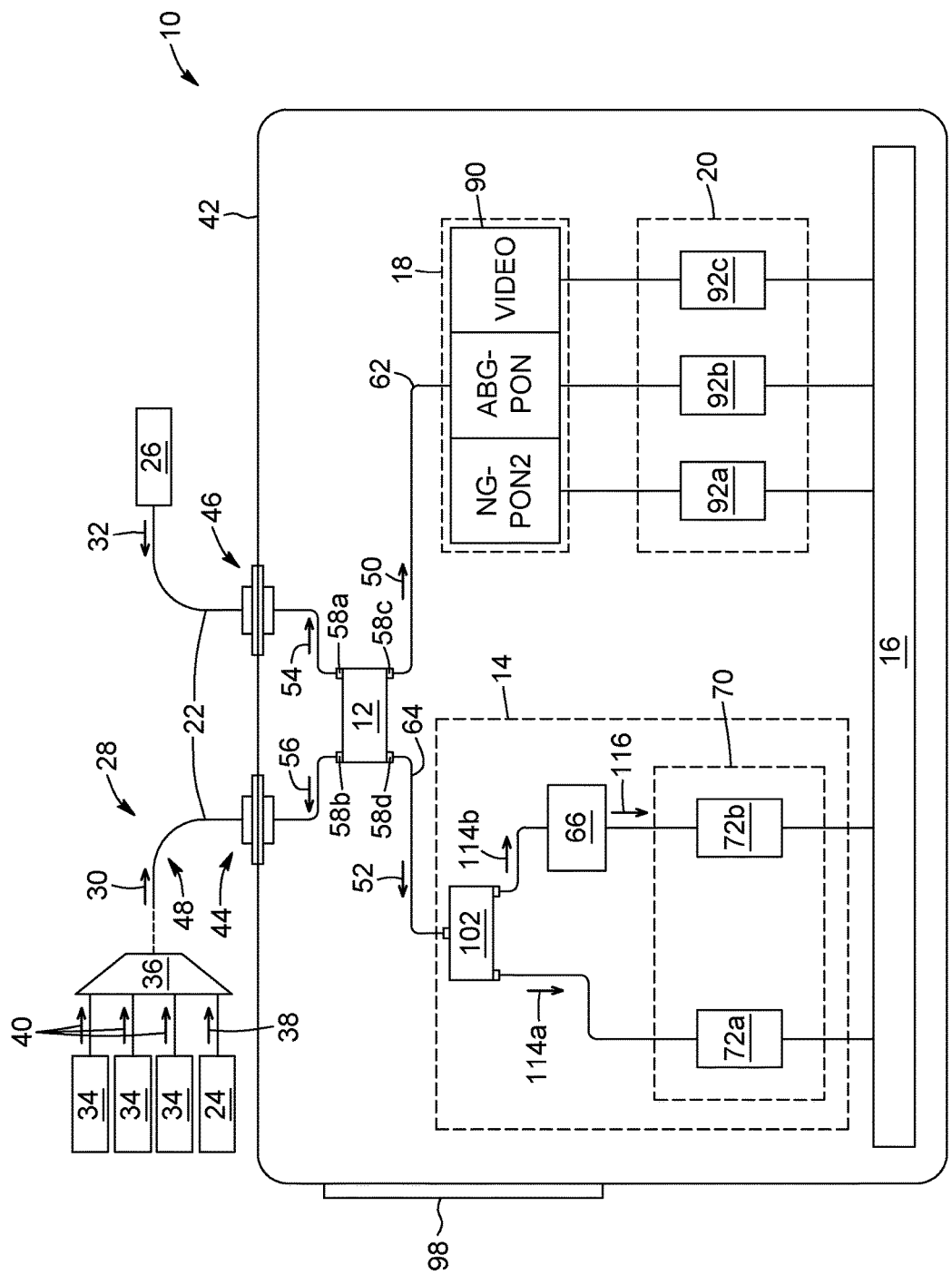
FIG. 6 is a schematic block diagram of a device for optical power measurement in a multiple-wavelength PON system shown along with elements of the PON system, in accordance with a fifth exemplary embodiment.

Referring now to FIG. 6, there is illustrated a fifth exemplary embodiment of a device 10 operable as a PON power meter. The device 10 of FIG. 6 is suitable for optical power measurement along an optical transmission path 22 extending between a first network element 24 and a second network element 26 in a PON 28. In the illustrated embodiment, the first network element 24 is embodied by an OLT and the second network element 26 is embodied by an ONT. The optical transmission path 22 supports concurrent, bidirectional propagation of downstream light 30 and upstream light 32. The device 10 aims to measure the optical power of a downstream signal of interest 38 in the downstream light 30.

This fifth embodiment shares many features with the embodiments presented above, which will not be described again in detail other than to highlight differences. The device 10 in FIG. 6 generally includes an optical power splitter assembly 12 configured to extract, from the optical transmission path 22, a portion 50 of the downstream light 30 and a portion 52 of the upstream light 32. The device 10 also includes an upstream wavelength analyzer 14, a processing unit 16, a downstream filter assembly 18, and a downstream optical power meter assembly 20, as described further below.

The PON 28 in FIG. 6 has a different architecture than those in FIGS. 2 to 5, namely in that it supports coexistence of only two PON standards or layers (excluding RF video overlay). The two coexisting PON standards have non-spectrally-overlapping upstream transmission windows as well as non-spectrally-overlapping downstream transmission windows. In some implementations, one of the two PON standards can be ABG-PON (upstream transmission window: 1290 nm to 1330 nm; downstream transmission window: 1480 nm to 1500 nm), and the other one can be a "newer" PON standard. For example, in the embodiment of FIG. 6, the other PON standard is TWDM NG-PON2 (upstream transmission window: 1524 nm to 1544 nm; downstream transmission window: 1596 nm to 1603 nm). However, in other embodiments, the other PON standard can be XG-PON (upstream transmission window: 1260 nm to 1280 nm; downstream transmission window: 1575 nm to 1580 nm). Other possible configurations can include, without limitation, EPON and 10G-EPON; GPON and XGS-PON; EPON and XG-PON; EPON and XGS-PON; EPON and NG-PON2; GPON and 10G-EPON; and the like. In FIG. 6, the PON 28 also optionally supports a downstream video overlay band (1550 nm to 1560 nm) which, however, may not be present in other embodiments. In a typical operation, the user can enter a configuration file in which he or she provides information about the PON layers present in the PON 28 under test. Then, the processing unit 16 can detect the appropriate modulation format from those given in the configuration file to adjust the optical calibration of the detectors as well as the pass/fail thresholds associated with the PON standards supported in the PON 28 under test.

The upstream wavelength analyzer 14 is configured to receive the extracted portion 52 of the upstream light 32 from the optical power splitter assembly 12, and to determine therefrom an upstream spectral characteristic of the upstream light 32. In FIG. 6, the upstream spectral characteristic corresponds to the presence of the upstream light 32 in either the ABG-PON upstream spectral band or the NG-PON2 upstream spectral band. It is to be noted that unlike previously described embodiments, the embodiment of FIG. 6 is configured for single-wavelength NG-PON2 implementation, in which a single upstream wavelength channel and a single downstream wavelength channel are used. In such a case, the specific upstream and downstream wavelengths being used in the NG-PON2 layer of the PON under test need not be determined by the device of FIG. 6. Of course, in other applications, the embodiment of FIG. 6 could be adapted for multiple-wavelength NG-PON2 operation, for example using the principles described above.

In FIG. 6, the upstream wavelength analyzer 14 generally includes an upstream optical power splitter assembly 102, an upstream filter assembly 66, and an upstream detection assembly 70 having first and second upstream detection circuits 72a, 72b. The upstream optical power splitter assembly 102 is configured to receive the extracted upstream light 52 from the optical power splitting assembly 12, and to split it into a first upstream light component 114a and a second upstream light component 114b. The upstream optical power splitter assembly 102 typically has a 50:50 splitting ratio, but other splitting ratio values can be used in other embodiments.

The first upstream light component 114a of the extracted upstream light 52 is sent directly, as an unfiltered upstream signal, to the first upstream detection circuit 72a of the upstream detection assembly 70. The first upstream detection circuit 72a is configured to measure an optical power parameter $P_1$ associated with the first upstream light component 114a of the extracted upstream light 52. The first upstream detection circuit 72a can have a configuration corresponding to those of the detection circuits described above, or another suitable configuration.

The second upstream light component 114b of the extracted upstream light 52 is sent to the upstream filter assembly 66, which outputs a filtered upstream signal 116. The upstream filter assembly 66 includes an upstream bandpass filter configured to allow passage of light in an upstream spectral band encompassing the upstream transmission window of one of the two coexisting PON layers in the PON 28. In FIG. 6, the passband of the upstream bandpass filter is centered on 1310 nm. This passband central wavelength corresponds to the central wavelength of the upstream transmission window of ABG-PON, which extends from 1290 to 1330 nm. Preferably, the upstream passband filter has high out-of-band signal rejection or attenuation to enhance performance, for example 10 dB or more.

The filtered signal 116 outputted by the upstream filter assembly 66 is sent to the second upstream detection circuit 72b of the upstream detection assembly 70. The second upstream detection circuit 72b is configured to measure an optical power parameter $P_2$ associated with the filtered upstream signal 116. The optical power parameter $P_2$ is preferably of the same nature or measured in the same manner as the optical power parameters $P_1$ of the first upstream light component 114a of the extracted upstream light 52, to allow straightforward comparison between $P_1$ and $P_2$. Like the first upstream detection circuit 72a, the second upstream detection circuit 72b can have a configuration corresponding to those of the detection circuits described above, or another configuration.

Referring still to FIG. 6, the optical power parameters $P_1$ and $P_2$ can be compared or otherwise used to yield a detection signal indicative of the upstream spectral characteristic of the upstream light 32 and conveying information about a presence of the upstream light 32 in one of the first and second upstream transmission bands. For example, where the upstream optical power splitter assembly 102 has a 50:50 splitting ratio, $P_1$ and $P_2$ are expected to be nearly identical, or at least substantially similar, when the upstream light 32 is an ABG-PON signal, whose spectrum is contained in the passband of the upstream filter assembly 66. In contrast, $P_1$ and $P_2$ are expected to be significantly different from each other (e.g., $P_1 \gg P_2$) when the upstream light is an NG-PON2 signal, whose spectrum lies well outside the passband of the upstream filter assembly 66. In some implementations, the detection signal indicative of the upstream spectral characteristic can be based on a ratio between $P_1$ and $P_2$. Then, depending on the value of this ratio relative to a certain threshold value, the detection signal will convey information about whether the upstream light 32 is an ABG-PON signal or an NG-PON2 signal.

The upstream detection assembly 70 is coupled to the processing unit 16. The processing unit 16 is configured to receive, from the upstream detection assembly 70, the detection signal indicative of the upstream spectral characteristic and to determine therefrom a downstream spectral characteristic of the downstream signal of interest 38 in the downstream light 30. For example, in the embodiment of FIG. 6, the downstream spectral characteristic is a spectral range in which the downstream signal of interest 38 is expected to lie. More particularly, this spectral range is the NG-PON2 downstream band (1596 nm to 1603 nm) if the upstream light is an NG-PON2 signal, and the ABG-PON downstream band (1480 nm to 1500 nm) if the upstream light is an ABG-PON signal. Other downstream spectral ranges can be used in other embodiments, corresponding to other network standards.

Referring still to FIG. 6, the downstream filter assembly 18 receives and spectrally filters the extracted downstream light 50 to select therefrom a portion of the downstream signal of interest 38 according to the determined downstream spectral characteristic. The downstream filter assembly 18 can include a downstream demultiplexing assembly 90 configured to spectrally split the extracted downstream light 50 into three downstream spectral bands. The downstream filter assembly 18 may include cascaded wavelength demultiplexers, although various other splitting and filtering configurations and arrangements may also be used. In FIG. 6, the three downstream spectral bands are as follows:

- a first downstream spectral band ranging from 1575 nm to at least 1603 nm and encompassing NG-PON2 downstream signals associated with NG-PON2 upstream signals rejected by the upstream filter assembly 66 (i.e., between 1524 nm to 1544 nm);
- a second downstream spectral band ranging from 1480 nm to 1500 nm and encompassing ABG-PON downstream signals associated with ABG-PON upstream signals passed by the upstream filter assembly 66; and
- a third downstream spectral band ranging from 1550 nm to 1560 nm and encompassing downstream video signals.

It is to be noted that when the lower end of the first downstream spectral band is equal to 1575 nm, the embodiment of FIG. 6 can also be used directly in implementations where the PON layers in the PON 28 under test are ABG-PON and XG-PON rather than ABG-PON and NG-PON2, since the XG-PON downstream signals lie in a spectral band ranging from 1575 nm to 1580 nm.

Referring still to FIG. 6, the downstream optical power meter assembly 20 includes three power meter devices 92a to 92c coupled to the downstream filter assembly 18. Each one of the power meter devices 92a to 92c measures an optical power parameter of the filtered light outputted by the downstream demultiplexing assembly 90 in the corresponding one of the three downstream spectral bands. Depending on the application, the power meter devices 92a to 92c depicted in FIG. 6 may be implemented as described in previous embodiments, or may have other suitable configurations. As mentioned above, only one of the optical power parameters measured by the three power meter devices 92a to 92c corresponds to the "optical power parameter of interest", that is, the optical power parameter associated with the extracted portion of the downstream signal 38 of interest. As also mentioned above, the processing unit 16 can determine which of the power meter devices 92a to 92c measures the optical power parameter of interest based on the determination of the downstream spectral characteristic (e.g., presence in a certain downstream spectral range) of the downstream signal of interest from the measured upstream spectral characteristic (e.g., presence in a certain upstream spectral range) of the upstream light.

Method for Optical Power Measurement

Figure 7:
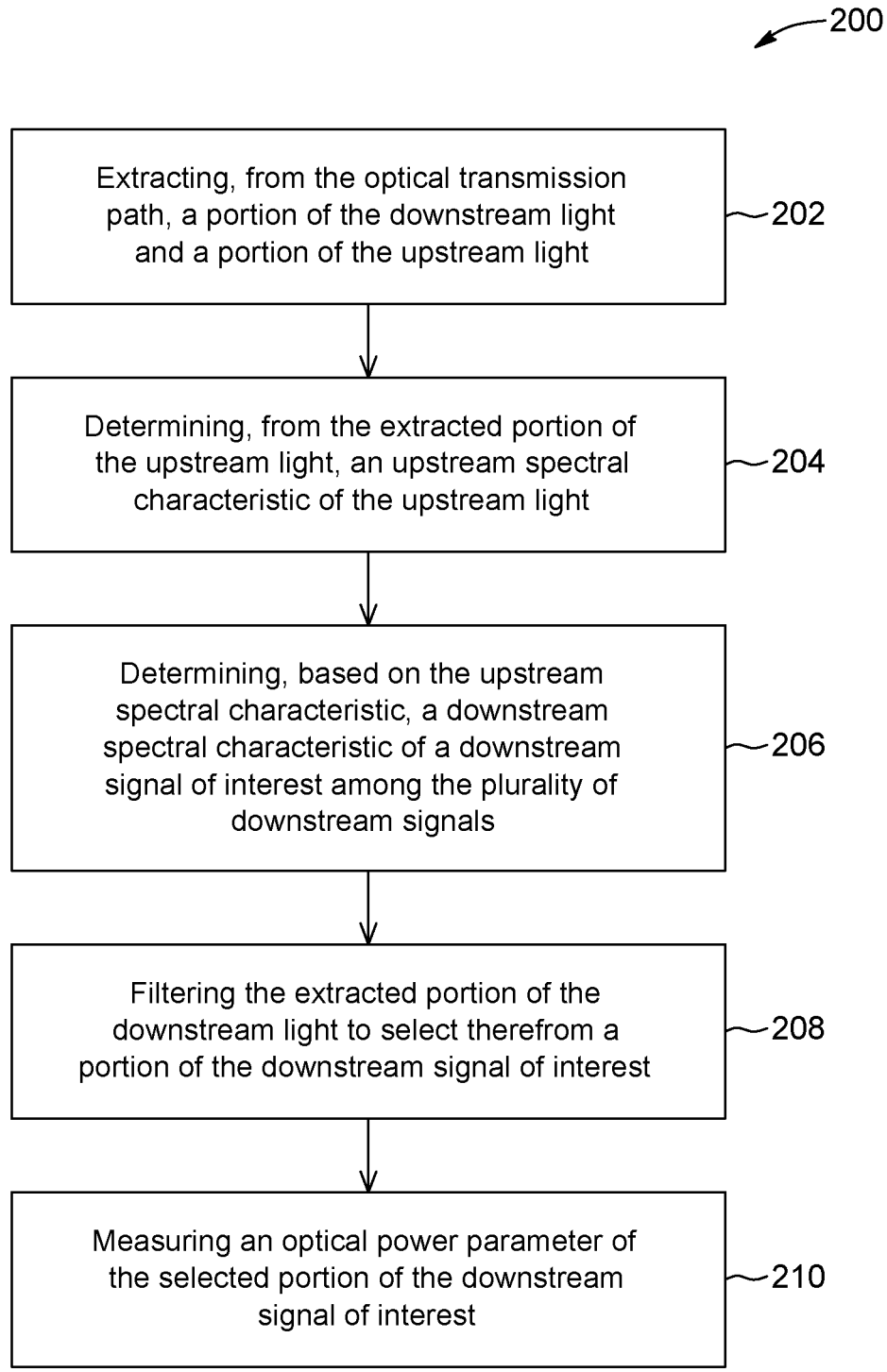
FIG. 7 is a flow chart of a method for optical power measurement along an optical transmission path between two network elements, in accordance with an exemplary embodiment.

Referring to FIG. 7, there is provided a flow chart of an embodiment of a method 200 for optical power measurement along an optical transmission path between a first network element and a second network element. The optical transmission path supports bidirectional propagation of downstream light and upstream light, the downstream light including a plurality of downstream signals having mutually different central wavelengths. The method 200 can be performed using a device such as described above with reference to FIGS. 2 to 6, or another device.

Broadly described, the implementation of the method 200 depicted in FIG. 7 involves a step 202 of extracting, from the optical transmission path, a portion of the downstream light and a portion of the upstream light. The method 200 also includes a step 204 of determining, from the extracted portion of the upstream light, an upstream spectral characteristic of the upstream light, followed by a step 206 of determining, based on the upstream spectral characteristic, a downstream spectral characteristic of a downstream signal of interest among the plurality of downstream signals. The method 200 further includes a step 208 of filtering the extracted portion of the downstream light to select therefrom a portion of the downstream signal of interest according to the determined downstream spectral characteristic, followed by a step 210 of measuring an optical power parameter of the selected portion of the downstream signal of interest.

In some implementations, the step 204 determining the upstream spectral characteristic can include measuring a value of a central wavelength of the upstream light, and the step 206 of determining the downstream spectral characteristic can include determining a value of a central wavelength of the downstream signal of interest. In such implementations, the determination of the value of the central wavelength of the downstream signal of interest can include accessing reference data relating a set of possible central wavelength values for the upstream light to a set of possible central wavelength values for the downstream signal of interest.

In some implementations, the step 208 of filtering the extracted portion of the downstream light can include tuning a passband center wavelength to the determined value of the central wavelength of the downstream signal of interest, for example in a wavelength range extending from 1524 nm to 1625 nm, or from 1596 nm to 1603 nm.

In some implementations, the step 204 of determining the upstream spectral characteristic can include monitoring a presence of the upstream light in each of a plurality of distinct upstream spectral bands and, upon detection of the presence of the upstream light in one of the upstream spectral bands, generating a detection signal indicative of the upstream spectral characteristic.

In some implementations, the step 208 of filtering the extracted portion of the downstream light can include spectrally splitting the extracted portion of the downstream light into a plurality of downstream spectral bands. In such implementations, the step 210 of measuring the optical power parameter of the portion of the downstream signal of interest includes measuring an optical power parameter of a filtered signal in each of the downstream spectral bands, such that one of the optical power parameters measured by the power meter devices corresponds to the optical power parameter of the portion of the downstream signal of interest.

In some implementations, the method 200 further includes identifying, based on the determined downstream spectral characteristic, the one of the optical power parameters measured by the power meter devices corresponding to the optical power parameter of the portion of the downstream signal of interest.

Of course, various modifications could be made to the embodiments disclosed herein and still be within the scope of the following claims.

The invention claimed is:

1. A device for optical power measurement in an optical network supporting upstream and downstream signal propagation along an optical transmission path, the device comprising:
   an upstream wavelength analyzer receiving upstream light extracted from the optical transmission path and configured to determine an upstream spectral characteristic of the extracted upstream light;
   a downstream filter assembly receiving downstream light extracted from the optical transmission path and configured to spectrally split the extracted downstream light into a plurality of downstream filtered signals, one of which corresponding to a downstream signal of interest;
   a processing unit configured to identify, based on the upstream spectral characteristic, the downstream signal of interest among the plurality of downstream filtered signals; and
   a downstream optical power meter assembly coupled to the downstream filter assembly and configured to measure an optical power parameter of the downstream signal of interest.

2. The device of claim 1, wherein the upstream wavelength analyzer is configured to output the upstream spectral characteristic as a detection signal corresponding to a wavelength value of the extracted upstream light.

3. The device of claim 1, wherein the upstream wavelength analyzer is configured to output the upstream spectral characteristic as a detection signal conveying information about a presence of the extracted upstream light in a specific upstream spectral range.

4. The device of claim 3, wherein the specific upstream spectral range corresponds to one among a first upstream spectral band ranging from about 1260 nm to 1280 nm, a second upstream spectral band ranging from about 1290 nm to about 1330 nm, and a third upstream spectral band ranging from about 1524 nm to about 1544 nm.

5. The device of claim 1, wherein the processing unit is configured to identify the downstream signal of interest among the plurality of downstream filtered signals by determining an expected value of a spectral position of the downstream signal of interest.

6. The device of claim 1, wherein the processing unit is configured to identify the downstream signal of interest among the plurality of downstream filtered signals by determining an expected downstream spectral range in which to find the downstream signal of interest.

7. The device of claim 6, wherein the expected downstream spectral range corresponds to one among a first downstream spectral band ranging at least from 1575 nm to about 1580 nm, a second downstream spectral band ranging from about 1480 nm to about 1500 nm, a third downstream spectral band ranging from about 1550 nm to about 1560 nm, and a fourth downstream spectral band ranging from about 1596 nm to about 1603 nm.

8. The device of claim 1, wherein the optical network supports coexistence of at least a first network standard and a second network standard, the first and second network standards having spectrally distinct first and second upstream transmission bands, and wherein the upstream wavelength analyzer comprises:
   an upstream optical power splitter assembly configured to split the extracted upstream light into a first upstream light component and a second upstream light component;
   an upstream filter assembly configured to filter, as a filtered upstream signal, the second upstream light component in a passband containing only one of the first and second upstream transmission bands; and
   an upstream detection assembly configured to measure a first optical power parameter of the first upstream light component and a second upstream optical power parameter of the filtered upstream signal, the upstream detection assembly generating a detection signal based on the first and second optical power parameters, the detection signal being indicative of the upstream spectral characteristic and conveying information about a presence of the upstream light in one of the first and second upstream transmission bands.

9. The device of claim 8, wherein the first upstream transmission band ranges from about 1524 nm to about 1544 nm and the second upstream transmission band ranges from about 1290 nm to about 1330 nm.

10. The device of claim 9, wherein, when the extracted upstream light is found to be present in the first upstream transmission band, the processing unit determines that the downstream signal of interest lies in a first downstream transmission band ranging from about 1596 nm to about 1603 nm, and wherein, when the extracted upstream light is found to be present in the second upstream transmission band, the processing unit determines that the downstream signal of interest lies in a second downstream transmission band ranging from about 1480 nm to about 1500 nm.

11. The device of claim 8, wherein the first upstream transmission band ranges from about 1260 nm to about 1280 nm and the second upstream transmission band ranges from about 1290 nm to about 1330 nm.

12. The device of claim 11, wherein, when the extracted upstream light is found to be present in the first upstream transmission band, the processing unit determines that the downstream signal of interest lies in a first downstream transmission band ranging from about 1575 nm to about 1580 nm, and wherein, when the extracted upstream light is found to be present in the second upstream transmission band, the processing unit determines that the downstream signal of interest lies in a second downstream transmission band ranging from about 1480 nm to about 1500 nm.

13. The device of claim 1, wherein the optical network supports coexistence of at least a first network standard and a second network standard, the first network standard having a first upstream transmission band ranging from about 1524 nm to about 1544 nm and the second network standard having a second upstream transmission band ranging from about 1290 nm to about 1330 nm, wherein, when the extracted upstream light is found to be present in the first upstream transmission band, the processing unit determines that the downstream signal of interest lies in a first downstream transmission band ranging from about 1596 nm to about 1603 nm, and wherein, when the extracted upstream light is found to be present in the second upstream transmission band, the processing unit determines that the downstream signal of interest lies in a second downstream transmission band ranging from about 1480 nm to about 1500 nm.

14. A method for optical power measurement in an optical network supporting upstream and downstream signal propagation along an optical transmission path, the method comprising:
  receiving upstream light extracted from the optical transmission path;
  determining an upstream spectral characteristic of the extracted upstream light;
  receiving downstream light extracted from the optical transmission path;
  spectrally splitting the extracted downstream light into a plurality of downstream filtered signals, one of which constituting a downstream signal of interest;
  identifying, based on the upstream spectral characteristic, the downstream signal of interest among the plurality of downstream filtered signals; and
  measuring an optical power parameter of the downstream signal of interest.

15. The method of claim 14, wherein determining the upstream spectral characteristic comprises generating a detection signal corresponding to a wavelength value of the extracted upstream light.

16. The method of claim 14, wherein determining the upstream spectral characteristic comprises generating a detection signal conveying information about a presence of the extracted upstream light in a specific upstream spectral range.

17. The method of claim 14, wherein identifying the downstream signal of interest among the plurality of downstream filtered signals comprises determining an expected value of a spectral position of the downstream signal of interest.

18. The method of claim 14, wherein identifying the downstream signal of interest among the plurality of downstream filtered signals comprises determining an expected downstream spectral range in which to find the downstream signal of interest.

19. The method of claim 14, wherein the optical network supports coexistence of at least a first network standard and a second network standard, the first and second network standards having spectrally distinct first and second upstream transmission bands, the method further comprising:
  splitting the extracted upstream light into a first upstream light component and a second upstream light component;
  filtering, as a filtered upstream signal, the second upstream light component in a passband containing only one of the first and second upstream transmission bands;
  measuring a first optical power parameter of the first upstream light component and a second upstream optical power parameter of the filtered upstream signal; and
  generating a detection signal based on the first and second optical power parameters, the detection signal being indicative of the upstream spectral characteristic and conveying information about a presence of the upstream light in one of the first and second upstream transmission bands.

20. The method of claim 19, wherein the first upstream transmission band ranges from about 1524 nm to about 1544 nm, and the second upstream transmission band ranges from about 1290 nm to about 1330 nm, the method further comprising: determining that the downstream signal of interest lies in a first downstream transmission band ranging from about 1596 nm to about 1603 nm when the extracted upstream light is found to be present in the first upstream transmission band; and determining that the downstream signal of interest lies in a second downstream transmission band ranging from about 1480 nm to about 1500 nm when the extracted upstream light is found to be present in the second upstream transmission band.

21. The method of claim 19, wherein the first upstream transmission band ranges from about 1260 nm to about 1280 nm, and the second upstream transmission band ranges from about 1290 nm to about 1330 nm, the method further comprising: determining that the downstream signal of interest lies in a first downstream transmission band ranging from about 1575 nm to about 1580 nm when the extracted upstream light is found to be present in the first upstream transmission band; and determining that the downstream signal of interest lies in a second downstream transmission band ranging from about 1480 nm to about 1500 nm when the extracted upstream light is found to be present in the second upstream transmission band.

22. The method of claim 14, wherein the optical network supports coexistence of at least a first network standard and a second network standard, the first network standard having a first upstream transmission band ranging from about 1524 nm to about 1544 nm and the second network standard having a second upstream transmission band ranging from about 1290 nm to about 1330 nm, the method further comprising: determining that the downstream signal of interest lies in a first downstream transmission band ranging from about 1596 nm to about 1603 nm when the extracted upstream light is found to be present in the first upstream transmission band; and determining that the downstream signal of interest lies in a second downstream transmission band ranging from about 1480 nm to about 1500 nm when the extracted upstream light is found to be present in the second upstream transmission band.

* * * * *